(12) United States Patent
Lu et al.

(10) Patent No.: US 7,783,617 B2
(45) Date of Patent: Aug. 24, 2010

(54) PERSONALS ADVERTISEMENT AFFINITIES IN A NETWORKED COMPUTER SYSTEM

(75) Inventors: Guotao Lu, Sunnyvale, CA (US); Jagdish Chand, Santa Clara, CA (US); Bryan Call, San Jose, CA (US); Andy Scott, Palo Alto, CA (US); Roger Urrabazo, Campbell, CA (US)

(73) Assignee: Yahoo! Inc., Sunnyvale, CA (US)

( * ) Notice: Subject to any disclaimer, the term of this patent is extended or adjusted under 35 U.S.C. 154(b) by 55 days.

(21) Appl. No.: 10/607,469

(22) Filed: Jun. 25, 2003

(65) Prior Publication Data
US 2004/0210565 A1 Oct. 21, 2004

Related U.S. Application Data

(63) Continuation-in-part of application No. 10/417,709, filed on Apr. 16, 2003, now Pat. No. 6,873,996.

(51) Int. Cl.
*G06F 17/30* (2006.01)
(52) U.S. Cl. .................. 707/706; 707/710; 707/715; 707/717; 707/728; 707/748
(58) Field of Classification Search ............. 707/104.1, 707/1–7; 705/14
See application file for complete search history.

(56) References Cited

U.S. PATENT DOCUMENTS

| | | | |
|---|---|---|---|
| 5,062,074 A | 10/1991 | Kleinberger | |
| 5,931,907 A | 8/1999 | Davies et al. | |
| 6,006,225 A | 12/1999 | Bowman et al. | |
| 6,026,388 A | 2/2000 | Liddy et al. | |
| 6,052,122 A * | 4/2000 | Sutcliffe et al. | ............. 715/751 |
| 6,144,944 A | 11/2000 | Kurtzman, II et al. | |
| 6,169,986 B1 | 1/2001 | Bowman et al. | |
| 6,185,558 B1 | 2/2001 | Bowman et al. | |
| 6,247,043 B1 * | 6/2001 | Bates et al. | ................. 709/200 |
| 6,263,355 B1 | 7/2001 | Harrell et al. | |
| 6,304,864 B1 | 10/2001 | Liddy et al. | |
| 6,401,084 B1 | 6/2002 | Ortega et al. | |
| 6,453,312 B1 | 9/2002 | Goiffon et al. | |
| 6,516,312 B1 | 2/2003 | Kraft et al. | |
| 6,564,213 B1 | 5/2003 | Ortega et al. | |
| 6,615,209 B1 | 9/2003 | Gomes et al. | |
| 6,658,423 B1 | 12/2003 | Pugh et al. | |
| 6,678,690 B2 | 1/2004 | Kobayashi et al. | |
| 6,681,247 B1 | 1/2004 | Payton | |

(Continued)

FOREIGN PATENT DOCUMENTS

WO    WO-01/46870 A1    6/2001

OTHER PUBLICATIONS

Donath etal., "The Sociable Web", http:/web.web.archive.org/web/19980216205524/http://judith.www.media, pp. 1-4.*

(Continued)

*Primary Examiner*—Don Wong
*Assistant Examiner*—Hanh B Thai

(57) ABSTRACT

A computer implemented method of searching personals ads comprising: performing a criteria search to identify one or more personals ads; and performing an affinity search to identify personals ads having an affinity to at least one of the personals ads identified by the criteria search.

21 Claims, 13 Drawing Sheets

User C comes to the site and does a search. They get the search result X and clicks on it.

These actions will be logged and will become affinities if thresholds are met.

U.S. PATENT DOCUMENTS

| | | | |
|---|---|---|---|
| 6,697,800 B1* | 2/2004 | Jannink et al. | 707/5 |
| 6,782,370 B1 | 8/2004 | Stack | |
| 6,853,982 B2* | 2/2005 | Smith et al. | 705/27 |
| 6,873,996 B2 | 3/2005 | Chand | |
| 6,912,505 B2* | 6/2005 | Linden et al. | 705/14 |
| 6,963,867 B2 | 11/2005 | Ford et al. | |
| 6,996,572 B1* | 2/2006 | Chakrabarti et al. | 715/205 |
| 7,076,483 B2 | 7/2006 | Preda et al. | |
| 7,089,237 B2 | 8/2006 | Turnbull et al. | |
| 7,124,353 B2* | 10/2006 | Goodwin et al. | 715/234 |
| 7,146,416 B1 | 12/2006 | Yoo et al. | |
| 7,225,187 B2 | 5/2007 | Dumais et al. | |
| 7,249,121 B1 | 7/2007 | Bharat et al. | |
| 7,424,469 B2 | 9/2008 | Ratnaparkhi | |
| 2002/0032682 A1 | 3/2002 | Kobayashi et al. | |
| 2002/0038241 A1 | 3/2002 | Hiraga | |
| 2002/0072895 A1 | 6/2002 | Imaanaka et al. | |
| 2002/0095409 A1 | 7/2002 | Takahashi et al. | |
| 2002/0194161 A1* | 12/2002 | McNamee et al. | 707/2 |
| 2002/0194166 A1 | 12/2002 | Fowler | |
| 2002/0198882 A1 | 12/2002 | Linden et al. | |
| 2003/0018621 A1* | 1/2003 | Steiner et al. | 707/3 |
| 2003/0046080 A1* | 3/2003 | Hejna, Jr. | 704/270 |
| 2003/0046389 A1 | 3/2003 | Thieme | |
| 2003/0088525 A1 | 5/2003 | Velez et al. | |
| 2003/0154196 A1* | 8/2003 | Goodwin et al. | 707/3 |
| 2003/0158867 A1* | 8/2003 | Goodwin et al. | 707/200 |
| 2003/0163485 A1* | 8/2003 | Goodwin et al. | 707/104.1 |
| 2003/0177127 A1* | 9/2003 | Goodwin et al. | 707/10 |
| 2003/0195877 A1 | 10/2003 | Ford et al. | |
| 2004/0088322 A1* | 5/2004 | Elder et al. | 707/103 Y |
| 2004/0088323 A1* | 5/2004 | Elder et al. | 707/103 Y |
| 2004/0088325 A1* | 5/2004 | Elder et al. | 707/104.1 |
| 2004/0117189 A1 | 6/2004 | Bennett | |
| 2004/0210600 A1 | 10/2004 | Chand | |
| 2004/0225629 A1 | 11/2004 | Eder | |
| 2005/0080764 A1 | 4/2005 | Ito | |
| 2005/0083906 A1* | 4/2005 | Speicher | 370/352 |
| 2005/0192955 A1 | 9/2005 | Farrell | |
| 2007/0005567 A1* | 1/2007 | Hermansen et al. | 707/3 |

OTHER PUBLICATIONS

M. Balabanovic et al., "Content-Based, Collaborative Recommendation", Communications of the ACM vol. 40, No. 3, Mar. 1988, pp. 66-72.

H. Kawano et al., "Mondou: Web search engine with textual data mining", 0-7803-3905, IEEE, Mar. 1997, pp. 402-405.

M. Tanaka et al., "Intelligent System for Topic Survey in MEDLINE by Keyword Recommendation and Learning Text Characteristics", Genome Informatics 11: 73-82, 2000, pp. 73-82.

International Search Report mailed on Nov. 15, 2004, for PCT patent application No. PCT/US04/11772 filed Apr. 16, 2004, 3 pages.

Liu, Yi et al. (2004). Affinity Rank: A New Scheme for Efficient Web Search, ACM 1-58113-912-8/04/0005, pp. 338-339.

Minwen Ji (2002). "Affinity-Based Management of Main Database Clusters," ACM Transactions on Internet Technology, 2(4): 307-339.

Anonymous. (2006). "Key" Oxford English Dictionary Online, located at <http://dictionary.oed.com>, last accessed on Sep. 23, 2006, thirty-four pages.

Calishain, T. et al. (Feb. 2003). "Google Hacks: 100 Industrial-Strength Tips & Tools," First Printing, pp. 18-24, 33, 288-289, 293-297.

Dialog Chronolog. (Sep. 1998). "New Features on DialogWeb™," two pages.

Dialog Information Services. (Jan. 1992). "DialogOnDisc Users Guide," Version 4.0 for DOS, pp. v1, (c), 2-1, 2-2, 3-4, 3-5, 3-9, 3-10, 3-11, 3-15, 3-17, 3-19, 3-21, 4-11, 4-21, 4-22, 4-27, 5-2, 5-7, 5-8, 5-9, 5-10, 5-11, c-2.

Dialog Information Services. (May 1995). "DialogLink for the Windows™ Operating System User's Guide," Version 2.1 pp. 1-2, 1-3, 4-1, 4-2, 5-2, 5-3.

Genova, Z. et al. (Nov. 2002). "Efficient Summarizatio of URLs using CRC32 for Implementing UURL Switching," *Proceedings of the 27th Annual IEEE Conference on Local Computer Networks LCN'02*, two pages.

Hammami, M. et al. (Oct. 2003). "Webguard: Web Based Adult Content and Filtering System," *Proceedings of the IEEE/WIC Conference on Web Intelligence (WI'03)*, five pages.

Lam-Adesina, A.M. et al. (Sep. 9, 2001). "Applying Summarization Techniques for Term Selection in Relevance Feedback," *SIGIR'01, ACM Press*, nine pages.

Merriam-Webster.com, "Merriam Webster Thesaurus," located at <http://web.archive.org/web/20030204132348http://www.m-w.com> last visited on Feb. 4, 2003, seven pages.

Netcraft, Site Report for "www.dialoweb.com," (May 10, 1998). located at <http://toolbar.netcraft.com/site_report?url=http://www.dialogweb.com> visited on Sep. 27, 2006, one page.

OED.com "Definition of prescribed," Dec. 2003, <Retrieved Mar. 3, 2008>, located at <http://dictonary.oed.com/cgi/ent....>, two pages.

Salton. G. (1986). "Abstracts of Articles in the Information Retrieval Area Selected by Gerald Salton," *ACM Portal*:39-50.

Sherman, C. (Aug. 23, 2005). "Google Power, Unleash the Full potential of Google," McGraw-Hill/Osborne, pp. 42-47, 77, 80-81, 100-107, 238-239, 421-422.

Sugiura, A. (Jun. 2000). "Query Routing for Web search engines: Architecture and Experiments," Computer Networks 2000, pp. 417-429, www.elsevier.com/locate/comnet.

Thomson Dialog, (2003). "DialogWeb Command Search Tutorial," Dialog Web Version 2.0 located at <http://support.dialog.com/techdocs/dialogweb_command_tutorial.pdf#search=%22dialogweb%202002%22> visited on Dec. 10, 2002, twenty-three pages.

Thomson Products, Extrinsic Evidence of the Common Ownership and Distribution of DialogWeb & DialogOnDisc, located at <http://dialog.com/contacts/forms/member.shtml> <http://www.dialog.com/products/platform/webinterface.shtml> <http://www.dialog.com/products/platform/desktop_app.shtml> visited on Sep. 27, 2006, three pages.

* cited by examiner

FIGURE 1A

My Advanced Search

My basics

My Gender and Preference
I'm a [Man] seeking a [Woman]

My City or ZIP/Postal Code
Seattle, WA [ change ]

About my match

I'm willing to date women who live within [15 miles] of my ZIP / postal code

I prefer to view ads with [Photos]

I'm interested in people who've been active [at any time]

Age Range [18] to [40]

Height Ranges [Any] to [Any]

*Physical*

Body Type:
☐ Slim   ☐ Thick
☐ Average   ☐ Slightly overweight
☐ Athletic   ☐ Large
Importance: ● Must Have  ○ Nice to Have  ○ Doesn't Matter Eye Color:
☐ Black   ☐ Gray
☐ Blue    ☐ Green
☐ Brown   ☐ Hazel
Importance: ● Must Have  ○ Nice to Have  ○ Doesn't Matter Hair Color:
☐ Auburn   ☐ Dark Brown
☐ Black    ☐ Red
☐ Blonde   ☐ White/gray
☐ Light Brown
Importance: ● Must Have  ○ Nice to Have  ○ Doesn't Matter

Helping a Friend?
If you're trying to find a date for a friend, now's your chance to
Be a Matchmaker

When to choose "Must Have" vs "Nice to Have"

Choose "Must Have" for qualities you'd like to have in a match.

Choose "Nice to Have" for qualities you'd like to have in a match but aren't necessary.

Choose "Doesn't Matter" if you want to see matches with any of the qualities listed.

The more details you provide, the greater your chances of connecting with someone great.

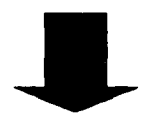

Figure 1B

Search Results

[ Save My Search ] [ Refine My Search ]    Had a great dat

My Matches    My Mutual Matches    1-10 of 418  First | < Prev | Next > | Last

P2 ★ Looking for new friends
(Active during the last 24 hours)
Age: 39; Seattle
Hey You! Im talking to you! Yeah me--the cute one! Fun, spunky, mom of a wonderful 6-year-old son; looking for new friends to spend time with. Educated and intelligent, I am self-employed computer pro ... More

P3 ★ Venus-ruled Libra Seeks Soul Mate
(Active during the last 24 hours)
Age: 32; Seattle
I would best be described as witty, intelligent, and down to earth. I enjoy good conversation, "guy movies", animals, and nature. My favorite movies are "Good Will Hunting" and &qu ... More

P4 ★ happily ever after .....
(Active during the last 3 days)
Age: 35; Seattle
Thank you for taking time reading my profile..... I am trying to find a special person to share the life with. Moved to US almost 5 years ago from a tropical country, and would love to relocate from S ... More

P5 ★ Kung Fu Betty seeks Animal Lover
(Active during the last 3 days)
Age: 32; Seattle
An intellectual warrior who rolls with the punches - (and occasionally throw a few), low maintainance? No-maintainance kind of girl, I adore my cat and worship my dog, and I love to travel and frequen ... More

P6 ★ HIGH ENERGY, NOT HIGH MAINTENANCE
(Active during the last 3 days)
Age: 38; Seattle
I'm happy, confident and thrive on positive relationships with people who challenge me and I them. I have a mischievous and witty sense of humor that sometimes gets me into trouble, but not for lo ... More

FIGURE 2A

Ad Detail: Back to Search Results    1 of 418 matches < Prev | Next >
[ Email Me! ]    [ Save Ad ] [ Email to a friend ] [ IM to a friend ]
NEW People who liked this person, also liked these people...

About Her | About Her Match | Idea Both

P2    Looking for new friends    — My Ideal
( Active during the last 24 hours )    bold = matching criteria Gender:         Woman seeking a Man
Location:       Seattle, WA
Age:            39 ( Aries )
Looking for:    Friends
Marital Status: Divorced
Ethnicity:      Caucasian (white)
Hair:           Blonde hair
Eyes:           hazel eyes
Body Type:      5'3", slim/petite body
Education:      College Grad
Employment:     Self-employed, no answer on income
Profession:     Computer-related / Hardware / Software
Religion:       No answer
Religious Services: No answer
Political Views: Middle of the road
Smoking:        Doesn't smoke
Drinking:       Drinks occasionally
Kids:           Yes - at home full-time
Wants Kids:     No answer on wanting more
Groups:         No answer
Interests:      Dancing · Dining · Family · Movies · Music Outdoor Activities · Reading · Sports · Theater · Travel

P8 P9

More about her:
Hey You! Im talking to you! Yeah me--the cute one! Fun, spunky, mom of a wonderful 6-year-old son; looking for new friends to spend time with. Educated and intelligent, I am self-employed computer programmer, who loves to have fun. I'm a silly, goofy, blonde, who loves to laugh, especially at myself, and is always looking at the brighter side of life; I am a genuine, kind, and caring person who treats others with respect. I avoid drama and conflict and anyone associated with it. Definitely, not a wallflower--Usually, the life of the party--doesn't need to hang on anyone, nor miss out on anything. Comfortable in any situation and believes that life is what you make of it. Achieving the most from life is a passion and sitting around and watching TV doesn't cut it. Being active, either hiking, biking, waterskiing, snow skiing, golfing or shopping (what girl doesn't love

FIGURE 2B

People who liked this person...

| P2 | Looking for new friends<br>(Active during the last 24 hours)<br>Hey You! Im talking to you! Yeah me--the cute one! Fun, spunky, mom of a wonderful 6-year-old son; looking for new friends to spend time with. Educated and intelligent, I am self-employed computer View This Ad |

Also liked these people... Where do these results come from?

1-10 of 208  First | < Prev |Next > | Last

| P6 | HIGH ENERGY, NOT HIGH MAINTENANCE<br>(Active during the last 3 days)<br>Age: 38; Seattle<br>I'm happy, confident and thrive on positive relationships with people who challenge me and I them. I have a mischievous and witty sense ... View This Ad<br>More like this ad |

| P10 | Home again!<br>(Active during the last 3 months)<br>Age: 41; Seattle<br>After ten years living in the UK, I have returned to the US to begin again, and am looking to meet friends and re-establish my life without ... View This Ad<br>More like this ad |

| P11 | Seeking Latino Partner for Adventure<br>(Active during the last week)<br>Age: 37; Seattle<br>I am an attractive, professional, adventurous, passionate woman looking for a partner in a life of adventure and discovery, both in the worl ... View This Ad<br>More like this ad |

| P12 | fast-talker&quick-wit seeks same<br>(Active during the last 3 months)<br>Age: 39; Seattle<br>I am very feminine. I wear dresses and heels alot. My favorite color is pink. Favorite animal is a kitten. I don't fish, hunt, camp, dri ... View This Ad<br>More like this ad |

FIGURE 2C

Search Results Flow:

Search Results

Click on ad detail

Affinity Search Results -- User has options to continue to browse the affinities or go back to original search Click Back to Search Results

Non-Search Results Flow:
FIG. 4A
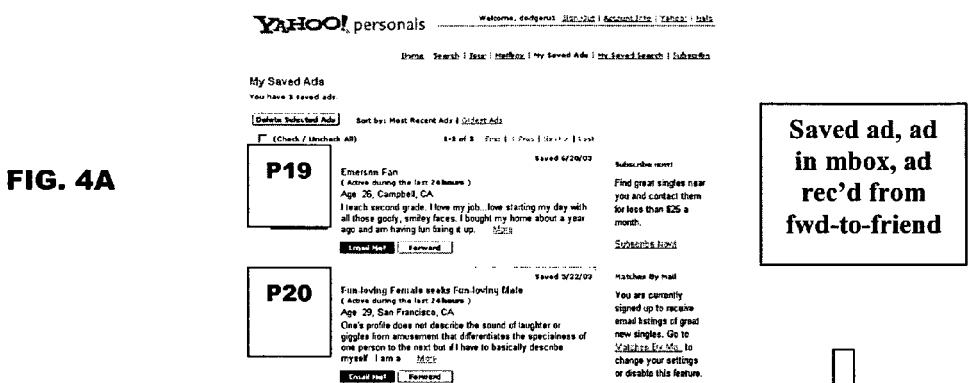
Saved ad, ad in mbox, ad rec'd from fwd-to-friend
FIG. 4B
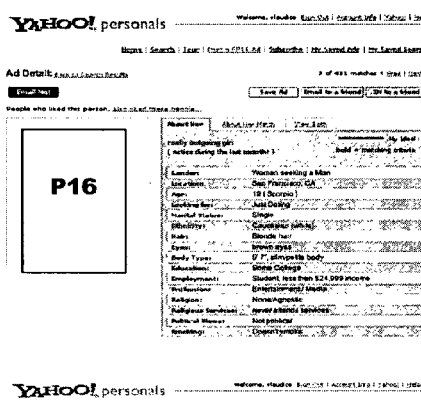
Click on ad detail
FIG. 4C
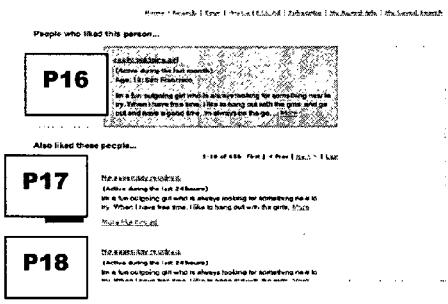
Affinity Search Results
– User has options to continue to browse the affinities or do a quick search
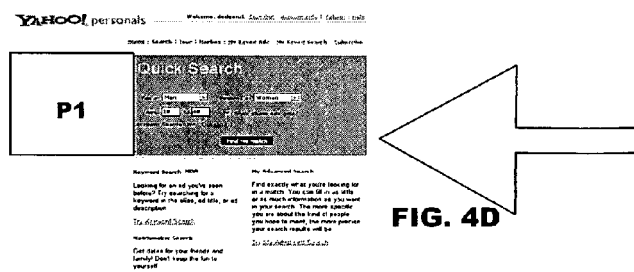
FIG. 4D

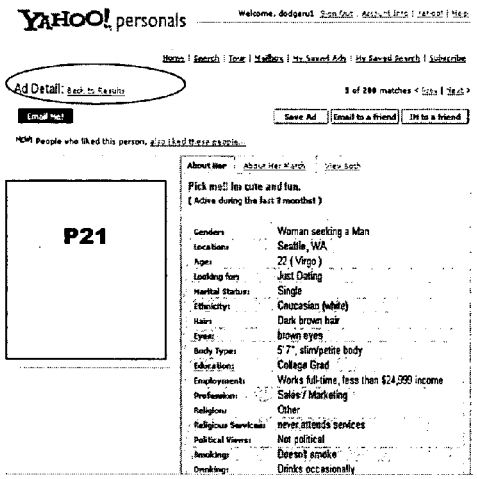
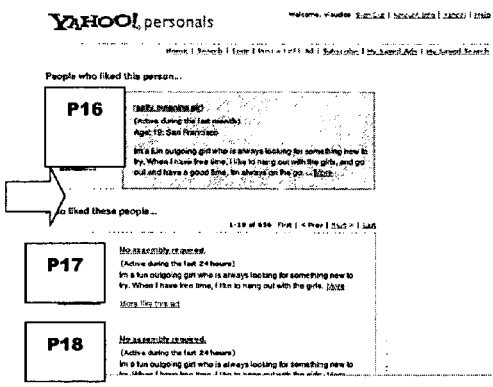
FIG. 5A  FIG. 5B
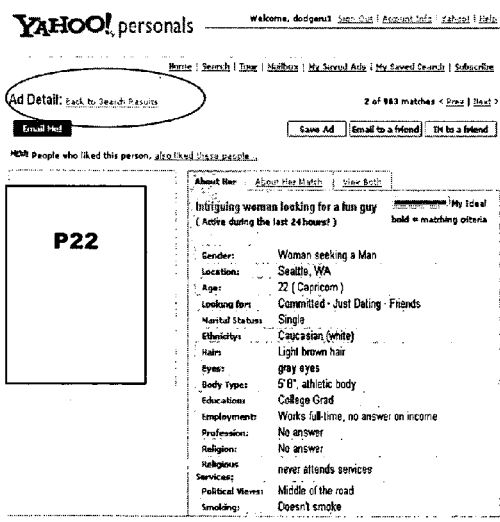
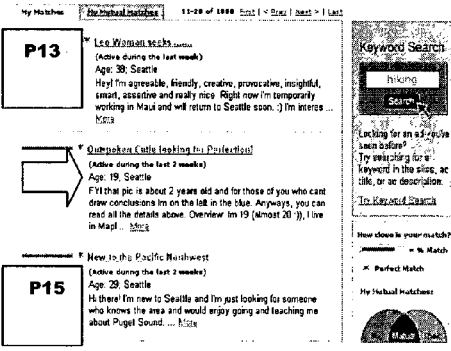
FIG. 6A  FIG. 6B

User A comes to the site and does a search. They get the search results X, Y, and Z and click on all three of them.

User B comes to the site and does a search. They get the search results X, Y, and Z and click on all three of them.

User C comes to the site and does a search. They get the search results Y and Z and click on both of them.

User C comes to the site and does a search. They get the search result X and clicks on it.

These actions will be logged and will become affinities if thresholds are met.

After the affinity data is processed, user D comes to the site and does a search. The search result contains X and he looks at the affinities it has. They will see X has the affinity with Y and Z.

PERSONALS ADVERTISEMENT AFFINITIES IN A NETWORKED COMPUTER SYSTEM

CROSS-REFERENCE TO RELATED APPLICATIONS

This application is a continuation-in-part of U.S. patent application Ser. No. 10/417,709, filed Apr. 16, 2003.

BACKGROUND OF THE INVENTION

1. Field of the Invention

The invention relates generally to networked computer systems for providing information and more particularly to computer implemented systems and methods to find affinities among personals advertisements.

2. Description of the Related Art

An affinity is a measure of association between different items. A person may want to know an affinity among items in order to identify or better understand possible correlation or relationships between items such as events, interests, people or products. An affinity may be useful to predict preferences. For instance, an affinity may be used to predict that a person interested in one subject matter also is likely to be interested in another subject matter. Specifically, for example, an affinity may be used to predict that a person who purchases a particular book is likely to be interested in purchasing one or more other specific books or that a person who plays a particular video game on-line is likely to be interested in playing one or more other video games.

One known approach to determining an affinity involves a computation based upon the number of occurrences of items and the number of occurrences of groupings of items. For example, according to this one approach, the affinity for item t1 with item t2 may employ information concerning:

N(t1): number of group IDs that include t1,
N(t2): number of group IDs that include t2,
N(t1, t2): number of group Ids that include both t1 and t2.
The affinity for item t1 for item t2 may be computed as,
N(t1,t2)/N(t1)
Conversely, the affinity for item t2 for item t1 may be computed as,
N(t1,t2)/N(t2)

FIG. 1 is an illustrative drawing of a computer user interface screen showing a hypothetical affinity analysis result. The affinity analysis result shows affinity among three automobiles: Honda Accord Sedan, Toyota Camry and Ford Taurus. In this example, the primary vehicle in the affinity analysis is the Honda Accord Sedan. A left portion of the screen shows user control buttons used to select vehicles for which an affinity analysis is to be performed. In this example, the primary vehicle in the affinity analysis is the Honda Accord Sedan. The other vehicles are the Toyota Camry and the Ford Taurus. The time frame for the analysis is December 2002. A top part of the center portion of the screen shows a Venn diagram style graphical representation of an affinity of Accord Sedan for Camry and of an affinity of Accord Sedan for Taurus. The degree of overlap of the Accord Sedan circle with the Camry circle graphically represents the affinity of the Accord Sedan with the Camry. Likewise, the degree of overlap of the Accord Sedan circle with the Taurus circle graphically represents the affinity of the Accord Sedan with the Camry. The overlaps represent the degree of affinity. A bottom part of the center portion of the screen provides a table showing affinities among the three autos. The top row of the chart shows a numerical measure of the strength of the affinity of the Accord Sedan to the Camry (23.7%) and to the Taurus (3.1%). A middle row shows a strength of the affinity of the Camry to the Accord (30.6%) and Taurus (4.2%). A bottom row shows a strength of the affinity of the Taurus to the Accord (18.3%) and to the Camry (19.2%). A right portion of the screen shows a table that lists strengths of affinities of the primary vehicle in rank order to the fifteen vehicles with the strongest affinities. In this example, the table on the right also lists the affinity of the primary vehicle to each other auto (i.e., Taurus, no. 63) selected on the left for affinity analysis even if the other auto is not in the top fifteen affinities.

An affinity analysis may be used to find similar keywords for a given keyword. For example, the following list is a hypothetical example list of keywords that may be found through a hypothetical affinity analysis to be similar to the keyword "007".

007 Similarity List
jamesbond
james bond 007
007.com
007 bond
bond
bond 007
james bond, 007
bond james bond
james bond 007: nightfire
james bond movies
007 nightfire
bond james
bond, james
die another day
james bond website
007 games
james bond characters
james bond nightfire
nightfire
agent 007
die another day movie Many of the above keywords do not even include the term "007", although they have been found to be keywords similar to "007".

One example of a practical use of an affinity analysis is to answer a question of the general type, if a user searches on the internet using a certain keyword, then what else is that user likely to search for on the internet? An affinity analysis can be used to answer this question. The analysis may, for example, result in identification of an ordered list of other keywords with the top 10, 100 or 1000 affinities to the certain keyword. Affinity analysis also can be used to answer questions of the general type, if a person buys flowers, what other things is that person likely to want to buy? These types of questions can be useful for cross-selling and in market research, for example.

Typically, an affinity between items is determined based at least in part upon how frequently items occur together in one or more groupings of items. There are many ways in which to define groupings of items. Examples of groupings that may occur in a computer network environment in connection with an IP address, a transaction identity (TID), a URL or a 'cookie'.

An IP address may be used to identify a particular user's computer. A TID may be used to identify a particular transaction such as a purchase of goods or services. For instance, a user may use a computer with a given IP address to form a connection with an internet accessible server site and to then purchase a number of items over the internet. The given IP address may serve as a group identity (group ID) for a grouping of items consisting of the items purchased together by the user. Also, the purchase transaction may have a TID which can be serve as a group ID for a grouping that includes the purchased items or services.

Groupings of keywords can be associated with a URL. The URL may serve as the group ID, and the keywords can serve as the items in the grouping. Such keyword grouping can be built up over time, for example, by keeping a record of keyword-based internet searches in which a keyword is used to identify a set of URLs, and a user then selects one or more identified URLs to visit a web page on the internet. A database of groupings can be developed over time. Selected URLs serve as group IDs, and the keywords used to identify the URLs are items within the groupings.

An internet cookie can be used to create groupings. Cookies are a general mechanism which server side connections (such as CGI scripts) can use to both store and retrieve information on the client side of the connection. A CGI (Common Gateway Interface) is used to interface an external application with information servers such as HTTP or web-servers. The addition of a simple, persistent, client-side state significantly extends the capabilities of Web-based client/server applications. A server, when returning an HTTP object to a client, may also send a piece of state information which the client will store. Included in that state object is a description of the range of URLs for which that state is valid. Any future HTTP requests made by the client which fall in that range will include a transmittal of the current value of the state object from the client back to the server. The state object is called a cookie. A computer's cookie identifier can serve as a group ID, and information stored with the cookie serve as items in a grouping.

The internet has created enormous opportunities to gather data useful in the study affinities between items. Huge databases comprising groupings such as those based upon IP addresses, TIDs, URLs or cookies can be developed. These databases can evolve over time as new grouping information is added.

While the internet is recognized as superb platform from which to find affinities between things like products, it has not been as efficient as a forum for finding affinities between people at a personal level. Although the internet has created new venues, such as chat rooms, for people to become acquainted with each other, it is often not a very been effective as a tool to help people to meet others who are compatible on a more personal level. A common approach used via the internet by individuals interested in finding people with whom they are compatible is the personals advertisement. A typical personals advertisement involves the posting of an on-line ad on an internet site. Such an ad generally includes selected information about a person. The advertisement may be characterized as personal because it is about an individual person. The advertisement also may be characterized as personal because, generally, it is created by a person to describe his or her own characteristics and interests. Usually, the goal of a personals advertisement is locate a companion with whom the personals advertiser can strike up a personal relationship.

Posting an advertisement typically involves a process in which personal advertisement creator (personals advertiser) fills out an online form which has several different information fields in which different types of information is entered. There may be fields for gender, age, location, employment, education, political views, physical characteristics, hobbies, what the advertiser is looking for in a companion, etc. Completion of individual fields may be mandatory or optional. A photograph may be mandatory or optional.

Once a personals advertisement has been created, it added to a database of personals advertisements that is accessible via the internet. Other individuals, who may or may not have posted their own personals ads in the personals database, can search the personals database for personals ads that describe persons with whom they may be compatible. A personals database search typically involves gaining access via the internet to an online personals ads search form which includes several different fields to receive different information describing the type of person the searcher wants to become acquainted with. These fields typically are the same as or quite similar to the fields filled in by a personals ad creator when filling out a form to describe himself or herself.

The information in the personals ads form fields and in the search form fields each constitute criteria by which the compatibility between searcher and individual personals ads creators is measured. Information entered in personals ads forms fields constitutes criteria set forth by personals ads creators. Information entered into search form fields constitutes criteria set forth by the searcher.

A computer implemented automated search process searches the database for personals ads with criteria that closely match the search criteria entered by the searcher. Personals ads with criteria that meet a prescribed degree of similarity to a searcher's search criteria are presented as matches to the searcher. The search process may present to the searcher results that include more than one matching personals ad. Moreover, the search process may present a prioritized list of matching personals ads in which ads are ordered based upon the degree to which their criteria match the searcher's search criteria. The searcher and personals ad creator then may arrange to get in touch with one another, perhaps electronically through email or instant messaging, for example.

While earlier approaches to online personals advertisements generally have been acceptable, there have been shortcomings with their use. For example, matching personals advertisers and searchers based upon degree of correlation between specific criteria entered by searcher and creator can be quite limiting since it turns up results based upon matching of specific pre-conceived criteria. Matching searchers with personals ad creators based only upon criteria matching does not really open the imagination to other qualities in a person the searcher or the ad creator might find to be compelling. Also, finding a companion based primarily upon a criteria matching process does not provide the searcher or the personals advertiser with any systematic feedback as to how he or she might adjust a search pattern to improve the chances of locating the right person. Thus, criteria matching tends to narrow the scope of a search based upon pre-conceived criteria that may in fact not be the best.

Therefore, there has been a need for improvement in computer implemented processes for finding affinities among people. More specifically, there has been a need for improvement in finding affinities between people through online personals advertisements. The present invention meets these needs.

SUMMARY

In one aspect, a computer implemented method of searching personals ads is provided. In one example the method includes performing a criteria search to identify one or more first personals ads, and performing an affinity search to identify one or more second personals ads having an affinity to at least one of the first personals ads identified by the criteria search.

In another example, a method of obtaining personals ads comprises performing an affinity search based on a first personals ad to identify one or more second personals ads having an affinity to the first personals ad, wherein the affinity between the first personals ad and each of the second personals ads is determined from previous indicated interests in the first personals ad and each of the second personals ads. In one example, an affinity value between the first personals ad and each of the second personals ads is configured from the previous indicated interests in the first personals ad and each of the second personals ads, and the second personals ads may be prioritized based on the affinity value. In one example, the first personals ad and each of the second personals ads have dissimilar criteria fields relative to each other.

In another aspect, a system for obtaining personals ads is provided. In one example the system includes logic operable to perform an affinity search based on a first personals ad to identify one or more second personals ads having an affinity to the first personals ad, wherein the affinity between the first personals ad and each of the second personals ads is determined from previous indicated interests in the first personals ad and each of the second personals ads.

In another aspect, a computer program product comprising program code associated with obtaining personals ads is provided. In one example the computer program product comprising program code operable to perform an affinity search based on a first personals ad to identify one or more second personals ads having an affinity to the first personals ad, wherein the affinity between the first personals ad and each of the second personals ads is determined from previous indicated interests in the first personals ad and each of the second personals ads.

BRIEF DESCRIPTION OF THE DRAWINGS

FIG. 1A shows an illustrative computer screen display of an online electronic entry search form, in accordance with an embodiment of the invention, into which a person (a searcher) who wishes to search a personals ad database may enter criteria describing some of the criteria sought in a person the searcher may want to meet.

FIG. 1B shows an illustrative computer screen display of another more elaborate online electronic entry search form, in accordance with an embodiment of the invention, into which a searcher may enter search criteria.

FIG. 2A shows an illustrative computer screen display of an example search results summary automatically produced by a computer implemented search process in response to search criteria entered using forms such as those in FIGS. 1A-1B, in accordance with an embodiment of the invention.

FIG. 2B shows an illustrative computer screen display of an example detailed personals ad automatically displayed when a searcher selects the 'More' link at the top of the summary ad screen of FIG. 2A.

FIG. 2C shows an illustrative computer screen display of affinity results comprising a set of summary personals ads that have been determined to have an affinity to the personals ad of FIG. 2B in accordance with an embodiment of the invention; the screen in FIG. 2C is automatically displayed when a searcher selects the 'also liked this person . . . ' link near the top of the screen of FIG. 2B.

FIGS. 4A-4D show a series of screens that illustrate navigation from a non-search source (e.g. saved ad, ad in mailbox, ad received from fwd-to-friend) to affinity results to a search criteria entry form screen.

FIGS. 5A-5B show a screen sequence that illustrates navigation from a detailed ad screen back to an affinity results screen from which the detailed ad screen was produced.

FIGS. 6A-6B show a screen sequence that illustrates navigation from a detailed ad screen back to a criteria search results screen from which the detailed ad screen was produced.

DETAILED DESCRIPTION OF THE PREFERRED EMBODIMENTS

The following description is presented to enable any person skilled in the art to make and use the invention, and is provided in the context of particular applications and their requirements. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

A. Online Searching

Figure 1:
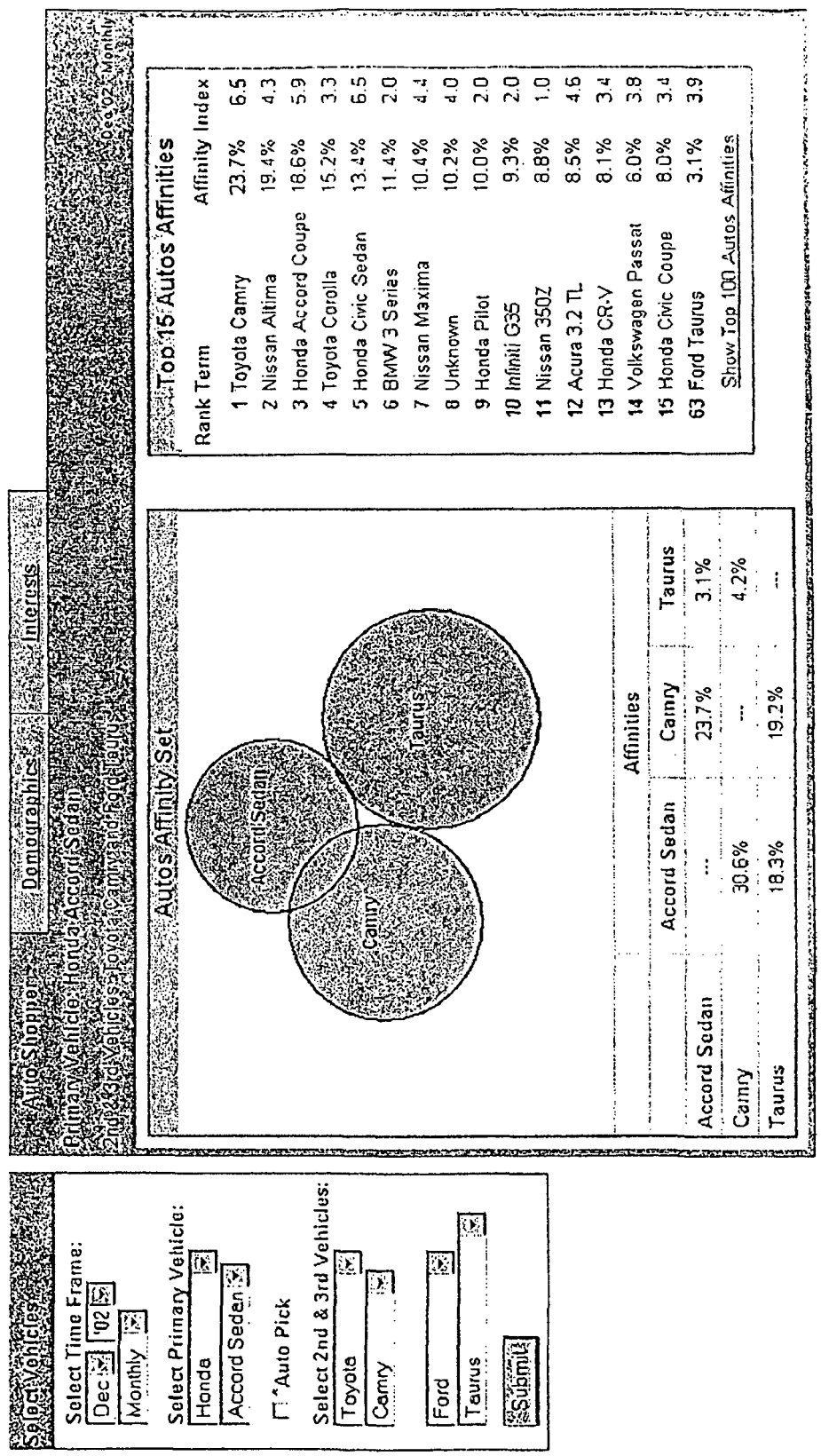
FIG. 1 is an illustrative drawing of a computer user interface screen showing a hypothetical affinity analysis result.

FIG. 1A shows an illustrative computer screen display of an online electronic entry search form, in accordance with an embodiment of the invention, into which a person (a searcher)

who wishes to search a personals ad database may enter criteria describing some of the criteria sought in a person the searcher may want to meet. This form is a 'Quick Search' form that requests only a minimal amount of information. In this example, the form has fields to identify the genders of the searcher and the sought after personals ad creator, age range, location of the ad creator and whether or not a photo is required. In this case the searcher is a man searching for a women between the ages of 30-40 in the Seattle Wash. area.

FIG. 1B shows an illustrative computer screen display of another more elaborate online electronic entry search form, in accordance with an embodiment of the invention, into which a searcher may enter search criteria. This form which is labeled 'My Advanced Search', requests much more information. It includes a region labeled 'My basics' that describes some of the characteristics of the searcher. It also includes a region labeled 'About my match' that sets forth criteria for the sought after personals ad creator. In this example, the searcher has the option to enter in additional criteria about the sought after ad creator such as physical attributes, family status, professional status, religious and political views.

FIG. 2A shows an illustrative computer screen display of an example search results summary automatically produced by a computer implemented criteria search process in response to search criteria entered using forms such as those in FIGS. 1A-1B, in accordance with an embodiment of the invention. The criteria search results summary screen includes summary details of multiple personals ads that have been determined by a search process to match search form criteria. It will be appreciated that the search process selects personals ads based upon degree of correlation between search form criteria entered by an online searcher and personals ads criteria stored in an internet accessible database. The criteria search results summary screen presents the ads in a prescribed order according to their degree of correlation with the search criteria. Ads with a higher correlation are listed ahead of ads with lower correlations. The computer implemented search process will be readily understood by persons skilled in the art and does not comprise a novel part of the present invention, and therefore, will not be described in detail herein.

The summary screen in this example for indicates that there are 418 matches based upon search form criteria and personals ads criteria, although only five summary adds are shown. The summary screen includes buttons to save search results, to refine the search and to navigate (First, <prev, next>, last) through the entire list of summary ads. Each respective summary add includes a respective link labeled 'More' that may be clicked to access more details about the respective personals ad. In this example, all of the summary personals ads pertain to women are between the ages of 30-40 who live in the Seattle area.

FIG. 2B shows an illustrative computer screen display of an example detailed personals ad automatically displayed when the searcher selects the 'More' link at the top of the summary ad screen of FIG. 2A. This example detailed personals ad includes all of the criteria entered by this ad's creator. It also includes a short personalized narrative or message. This screen includes buttons to save the ad, email the add to a friend or instant message (IM) the add to a friend.

In addition, the illustrative screen includes an affinity link labeled, 'also liked these people . . . ', that provides a novel segue to other personals ads that may or may not meet the specific search criteria entered by the searcher using screens of FIGS. 1A-1B. By clicking on the 'also liked this person . . . ' link (i.e., the affinity link), the searcher may journey beyond the scope of personals ads elicited through the criteria matching process, and explore ads that other searchers have suggested through their actions, to be related to the detailed ad. As explained more fully below, the personals ads presented in response to selecting the 'also liked this person . . . ' link are ads determined to have an affinity to the detailed ad. This affinity is determined through a computer implemented process that tracks the actions of a multitude of searchers and surmises affinities between personals ads based upon the actions performed with respect to numerous ads by many different searchers over a period time.

Of course, each personals ad represents a person. Affinities between personals ads represent potential affinities between people represented by those ads. The 'also liked this person . . . ' link provides an avenue whereby a searcher can leap off from computer generated search results produced from pre-conceived criteria, and explore personal ads that for some reason, have been found over time by other searchers, to bear some affinity to personal ads returned based upon search criteria alone.

If an ad has does not have an affinity to other ads, then the 'also liked this person . . . ' link is not activated or displayed. As explained below, personals ads may develop affinities over time depending upon he actions of a multitude of searchers. Thus, depending upon searcher activity, a link on a given ad may be activated or de-activated over time, and the set of ads having an affinity to that given ad may change over time.

FIG. 2C shows an illustrative computer screen display of affinity results comprising a set of summary personals ads that have been determined to have an affinity to the personals ad of FIG. 2B in accordance with an embodiment of the invention. The screen in FIG. 2C is automatically displayed when a searcher selects the 'also liked this person . . . ' link near the top of the screen of FIG. 2B. In general, affinity results are likely to include personals ads of people meeting some or most of the search criteria used by a searcher to surfaced from the ads database the ads of the screens of FIGS. 2A-2B. However, the affinity results also are likely to include personals ads that were retrieved from the ads database by different searchers using different search criteria that somehow also surfaced the ad of FIG. 2B. For instance, the second from the top personals ad in FIG. 2C lists age as 41 years, which is outside the 18-40 age range specified in search screen of FIG. 1B. The second from the top ad of FIG. 2C, therefore, probably would not have come up, or at least would not have been highly ranked, in response to the search criteria of FIG. 1B. Thus, the affinities results open doors to other opportunities that a searcher might have never chosen—in essence it's a wild card approach to the online personals scene.

The affinity results screen of FIG. 2C includes a summary of the original ad on which affinity results are based, the ad of the screen of FIG. 2B in this example. It lists the affinity results as a series of summary ads determinate to have an affinity to that original ad. This format, which includes the original ad, helps the searcher to keep track of which original ad was the jumping off point for the affinity results.

Figure 3A:
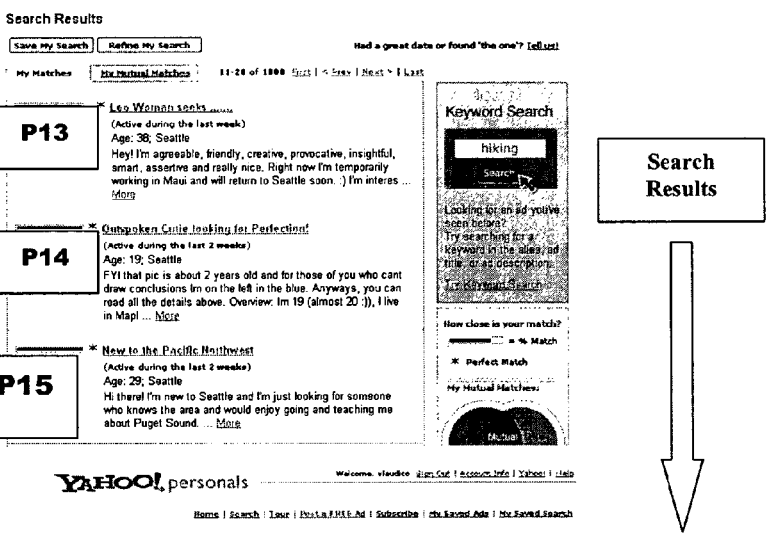
FIGS. 3A-3C show a series of screens that illustrate navigation from search criteria results to affinity results and back again.
Figure 3B:
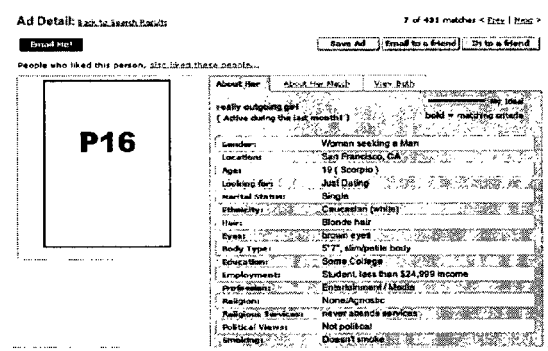
Figure 3C:
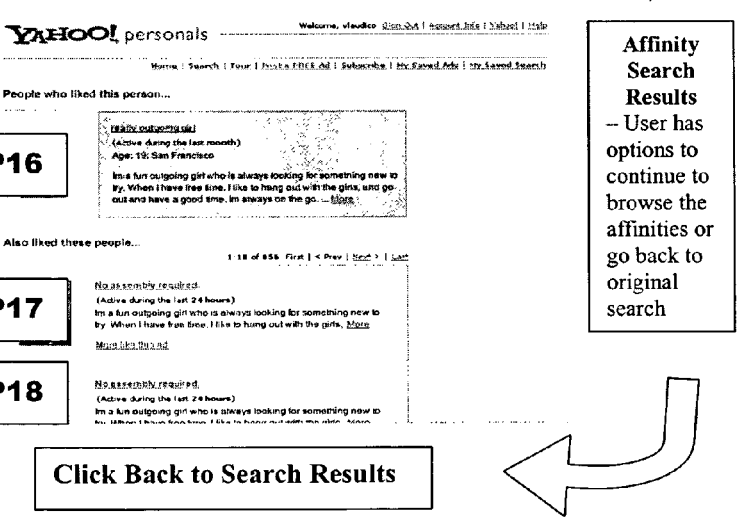

FIGS. 3A-3C show a series of screens that illustrate navigation from search criteria results to affinity results and back again. The illustrative screen of FIG. 3A displays a series of summary ads in response to a search criteria matching process. The screen of FIG. 3B displays a detailed ad in response to a searcher's having clicked on, or otherwise selected, a summary ad from the search results of the screen of FIG. 3A. It is noted that a summary ad corresponding to the detailed ad of FIG. 3B is not actually visible in FIG. 3A. However, persons skilled in the art will appreciate that a searcher can easily navigate from the screen of FIG. 3A to find the summary ad for the ad of FIG. 3B and then select that summary ad to arrive at the detailed ad of FIG. 3B. The illustrative screen of FIG. 3C displays affinity results for the detailed ad of FIG. 3B in response to a searcher's having clicked on the 'also liked these people . . . ' link on the screen in FIG. 3B. At the bottom of the screen of FIG. 3C, there is a button that can be actuated to return the searcher to the illustrative search criteria results screen of FIG. 3A.

FIGS. 4A-4D show a series of screens that illustrate navigation from a non-search source (e.g. saved ad, ad in mailbox, ad received from fwd-to-friend) to affinity results to a search criteria entry form screen. The illustrative screen of FIG. 4A displays a series of summary ads retrieved from a 'My Saved Ads' storage. It will be appreciated that a searcher may have obtained these ads during a prior search, but the searcher may not be currently engaged in a search. The illustrative screen of FIG. 4B displays a detailed ad selected from the summary ads of FIG. 4A. Although the detailed ad of FIG. 4B is not visible in FIG. 4A, persons skilled in the art will appreciate that a searcher can navigate via the screen of FIG. 4A to find a summary ad corresponding to the detailed ad of FIG. 4B, and then select it. The illustrative screen of FIG. 4C displays affinity results displayed in response to a searcher's clicking, or otherwise selecting, the 'also liked these people . . . ' link on the screen of FIG. 4B. The illustrative screen of FIG. 4D displays a 'Quick Search' form that is displayed in response to a searcher's selecting a 'do a quick search' button (not shown) on the screen of FIG. 4C.

Alternatively (not shown), a searcher could click on an 'also liked these people . . . ' link on one of the summary ads of the screen of FIG. 4C in order to view ads with an affinity to the add with the selected link. This searcher could continue to click 'also liked these people . . . ' links rather than return to the original criteria search (like FIG. 3A) results or to initiate a new search (like FIG. 4D).

FIGS. 5A-5B show a screen sequence that illustrates navigation from a detailed ad screen back to an affinity results screen from which the detailed ad screen was produced. The illustrative screen of FIG. 5A displays a detailed ad that was displayed in response to selection of the 'More' button of the screen of FIG. 5B. When a 'Back To Results' button on the ad of FIG. 5A is selected, the screen of FIG. 5B is again displayed.

FIGS. 6A-6B show a screen sequence that illustrates navigation from a detailed ad screen back to a criteria search results screen from which the detailed ad screen was produced. The illustrative screen of FIG. 6A displays a detailed ad that was displayed in response to selection of the 'More' button of the screen of FIG. 6B. When a 'Back To Results' button on the ad of FIG. 6A is selected, the screen of FIG. 6B is again displayed.

It will be appreciated that a searcher can use criteria search results as a jumping off point for an affinity search. For example, a searcher could switch back and forth between criteria based search and affinity based searching. For instance, a searcher could start out by generating criteria based search results using a set of criteria entered in screens like those of FIGS. 1A-1B. The searcher then could transition to an affinity search using affinities between personals ads derived from the actions of others. The criteria based search results would provide the personals ads used as the starting point for the affinity based searching. In this manner, a searcher can supplement his or her own notions of what he or she seeks with the notions of others as to relationships among different specific personal ads.

For example, a searcher can start out with criteria based searching to find personals ads that are interesting. That searcher then can use an affinity search to, in essence, tap into the collective views of others as to possible affinities between a given ad (and the person who created that ad) and other ads (and people who created those ads) that the searcher may or may not have come across through criteria based searching. In this manner, a searcher can expand his or her understanding of the personals ads that he or she is searching and perhaps even come to a better understanding of the characteristics in a person that he or she is seeking.

Much more than with products, people typically need to have some type of validation that verifies their comfort level before jumping into a personal relationship with someone. At an emotional level, people want to know that the person in the ad they are viewing is validated some way other than showing up in a search result. Affinity results give searcher a validation that other people also were interested in a given ad, which is one of the most powerful tools in relationship building.

B. Logging User Actions and Tracking Thresholds

The conceptual drawings of FIGS. 7A-7D illustrate activities by searchers that may result in determinations that an affinity exists among one or more pairs of personals ads. The conceptual drawing of FIG. 8 illustrates an association of affinities to a personals ad displayed to a searcher. More specifically, the drawings of FIGS. 7A-7D conceptually represent the development of affinities pairs as a result of the actions of three representative searchers, and the drawing of FIG. 8 conceptually represents the availability of that affinity pair information by a subsequent searcher.

Figure 7A:
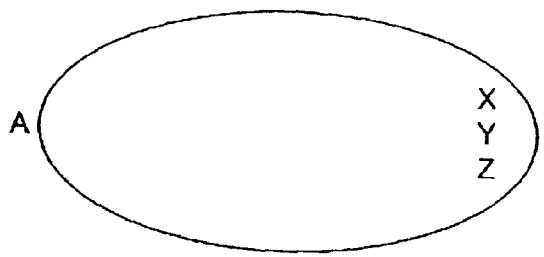
FIG. 7A is a conceptual Venn diagram style drawing that represents action by searcher A that results in a logging of activity on personals ads x, y and z.
Figure 8:
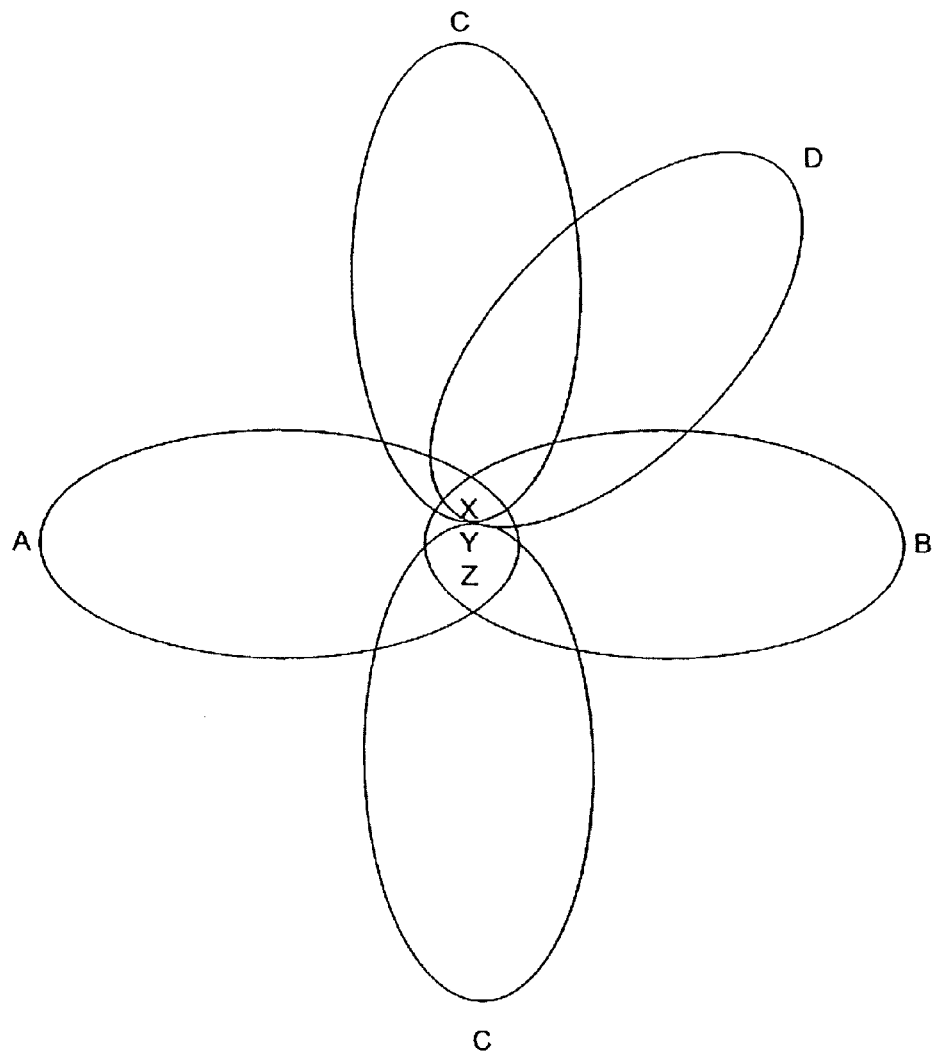
FIG. 8 is a conceptual Venn diagram style drawing that represents display of affinity results to searcher D after the indicative activities illustrated in FIGS. 7A-7D.

FIG. 7A is a conceptual Venn diagram style drawing that represents action by searcher A that results in a logging of activity on personals ads x, y and z. Specifically, in a present embodiment of the invention certain searcher activities cause logging of a pair-wise relationship among ads acted upon by a user. It is believed that certain activities by a searcher are indicative activates in that they indicate that the searcher has a real interest in the ad (and potentially in the creator of the ad).

In a present embodiment of the invention, these indicative activities are:
  (1) View and save ads they are interested in (making a mental note)
  (2) Forward a personals ad to a friend via mail or Instant Messenger (friend's opinion)
  (3) Reply to someone's ad by sending an e-mail and/or Instant Message (approach with interest)
  (4) Send canned/predefined messages expressing interest (flirt)

Not all searcher activities are indicative activities. For example, in a present embodiment, merely viewing a detailed view of an ad (as opposed to an ad summary) does not constitute an indicative activity. Thus, viewing of ad details are not logged for affinity analysis purposes.

FIG. 7A illustrates that searcher A has undertaken an indicative activity as to each of ads x, y and z. A result of searcher A's actions a pair-wise relationship is logged for each of the pairs (x,y), (x,z) and (y,z). As explained below, personals ads processing in accordance with the present invention utilizes the internet. Persons skilled in the art will appreciate that searcher activity can be tracked and logged through an internet site that hosts such activity.

Figure 7B:
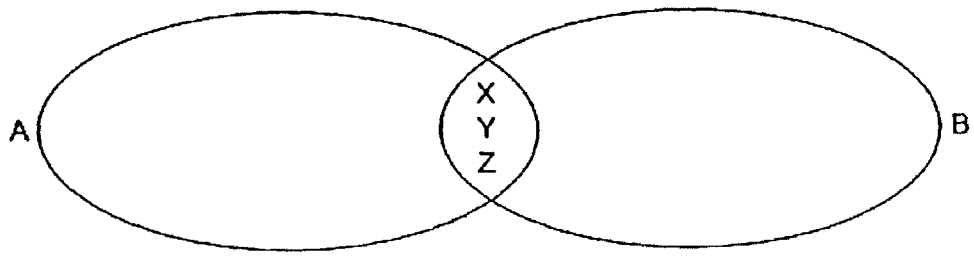
FIG. 7B is a conceptual Venn diagram style drawing that represents action by both searchers A and B that results in a logging of activity on personals ads x, y and z.

FIG. 7B is a conceptual Venn diagram style drawing that represents action by both searchers A and B that results in a logging of activity on personals ads x, y and z. FIG. 7B is cumulative. FIG. 7B illustrates that not only has searcher A undertaken indicative activity as to each of ads x, y and z, but also that searcher B has undertaken indicative activity as to each of ads x, y and z. Thus, as a result of the combined activities of searchers A and B two pair-wise relationship are logged for each of the pairs (x,y), (x,z) and (y,z). A first set of pair-wise relationships are due to searcher A. A second set of pair-wise relationships are due to searcher B.

Figure 7C:
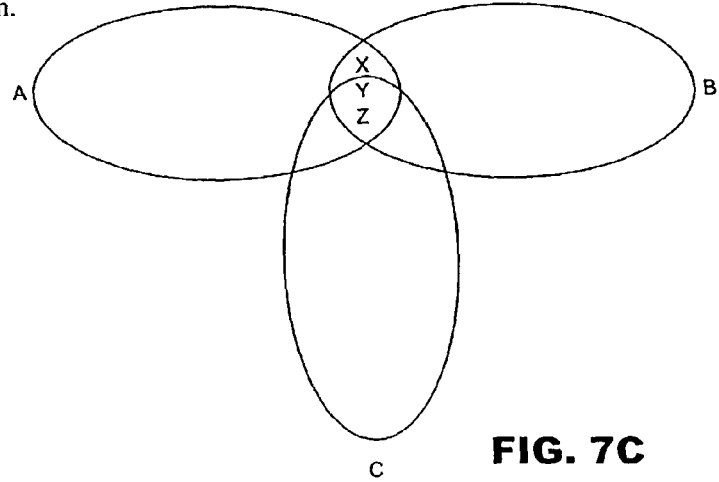
FIG. 7C is a conceptual Venn diagram style drawing that represents action by three searchers A, B and C that results in a logging of activity on personals ads x, y and z.

FIG. 7C is a conceptual Venn diagram style drawing that represents action by three searchers A, B and C that results in a logging of activity on personals ads x, y and z. FIG. 7C is cumulative. FIG. 7C illustrates that searchers A and B have undertaken indicative activity as to each of ads x, y and z and that searcher C has undertaken an indicative activity as toads y and z, but not x. Thus, as a result of the combined activities of searchers A, B and C, three pair-wise relationships are logged for pair (y,z), and two pair wise relationships are logged for each of pairs (x,y) and (x,z).

In a present embodiment of the invention, searcher activity may be tracked by a host system. A record may be maintained of the searcher activity, especially indicative activity. For instance, a record may be maintained as to the ads on which a searcher performed any of activities (1)-(4) listed above. In a present embodiment, a cookie, specifically a B-cookie. (B stands for 'Browser'), is used to record searcher activity. When a searcher visits a prescribed internet site, such as a site hosting a personals ad service like that described herein, a cookie on the user's machine is accessed to ascertain the identity of the searcher. If a B-cookie is used, then the searcher is identified in terms of the searcher's Browser. The cookie stores a history of the searcher's indicative activities. When a searcher visits a host site and performs certain ads related action, the host may access the searcher's cookie to update it with a record of the searcher's latest indicative activity and also to download information concerning past activities by the searcher. This downloaded information may be logged to contribute to the pair-wise relationship counts used to determine when there are affinities among ad pairs.

Figure 7D:
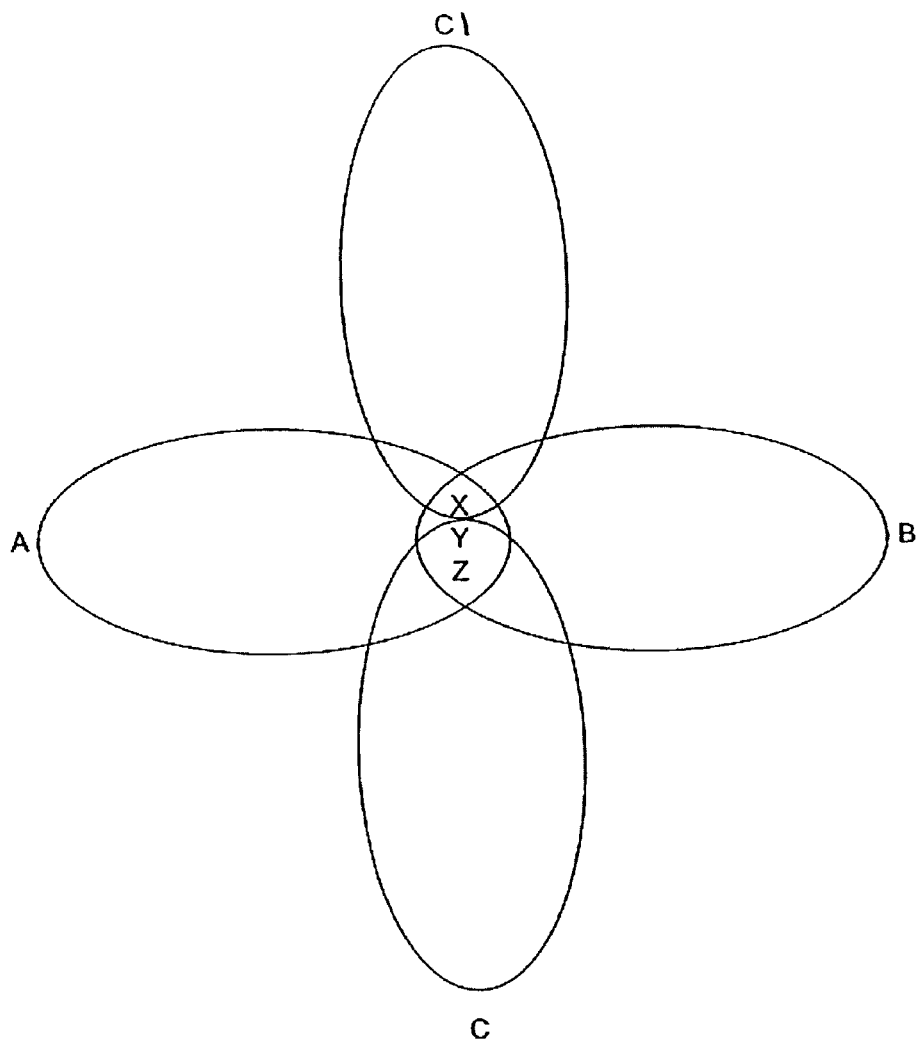
FIG. 7D is a conceptual Venn diagram style drawing that represents action by three searchers A, B and C that results in a logging of indicative activity on personals ads x, y and z, but at a time later than the time when the indicative activity represented in FIG. 7C were logged.

FIG. 7D is a conceptual Venn diagram style drawing that represents action by three searchers A, B and C that results in a logging of indicative activity on personals ads x, y and z, but at a time later than the time when the indicative activity represented in FIG. 7C were logged. FIG. 7D is cumulative. In FIG. 7C, a new ellipse labeled C1 has been added. This new ellipse C1 indicates that searcher C subsequently performed an indicative activity upon personals ad x. Thus, at the later time represented by FIG. 7D, each of searchers A, B and C has performed an indicative activity as to each of ads x, y and z. Thus, three pair-wise relationships are logged for each of the pairs (y,z), (x,y) and (x,z).

In a present embodiment of the invention, there is a prescribed threshold number of pair-wise relationships that must be logged in order for a pair of ads to be determined to have an affinity. That is, there is a minimum number of searchers who must have performed an indicative activity upon both ads in a given pair before those two ads in the pair are determined to have an affinity. For example, for the purpose of FIGS. 7A-7D and 8, it is assumed that the threshold is three. Thus, at the time of FIG. 7C, pair (y,z) would be determined to have an affinity, but pairs (x,y) and (x,z) would not. At the time of FIG. 7D, however all three of the pairs, (y,z), (x,y) and (x,z) would be determined to have an affinities.

FIG. 8 is a conceptual Venn diagram style drawing that represents display of affinity results to searcher D after the indicative activities illustrated in FIGS. 7A-7D. It is assumed that three pair-wise relationships for each of pairs (y,z), (x,y) and (x,z) is sufficient to meet a threshold level at which it is determined that there is an affinity between y and z, that there is an affinity between x and y and that there is an affinity between x and z. FIG. 8 illustrates that searcher D surfaced ad x. Ad x may have surfaced due to criteria search results or due to jumping off into an affinity search. Whatever the route taken by searcher D to get at ad x, once searcher D locates ad x, he or she may easily access affinity results that include ads y and z. Searcher D merely needs to select an Affinity results selector (e.g., 'also liked this person . . . ' link) on a computer display screen displaying ad x in order to be presented with ads y and z.

C. Affinity Analysis and Prioritization

Figure 9:
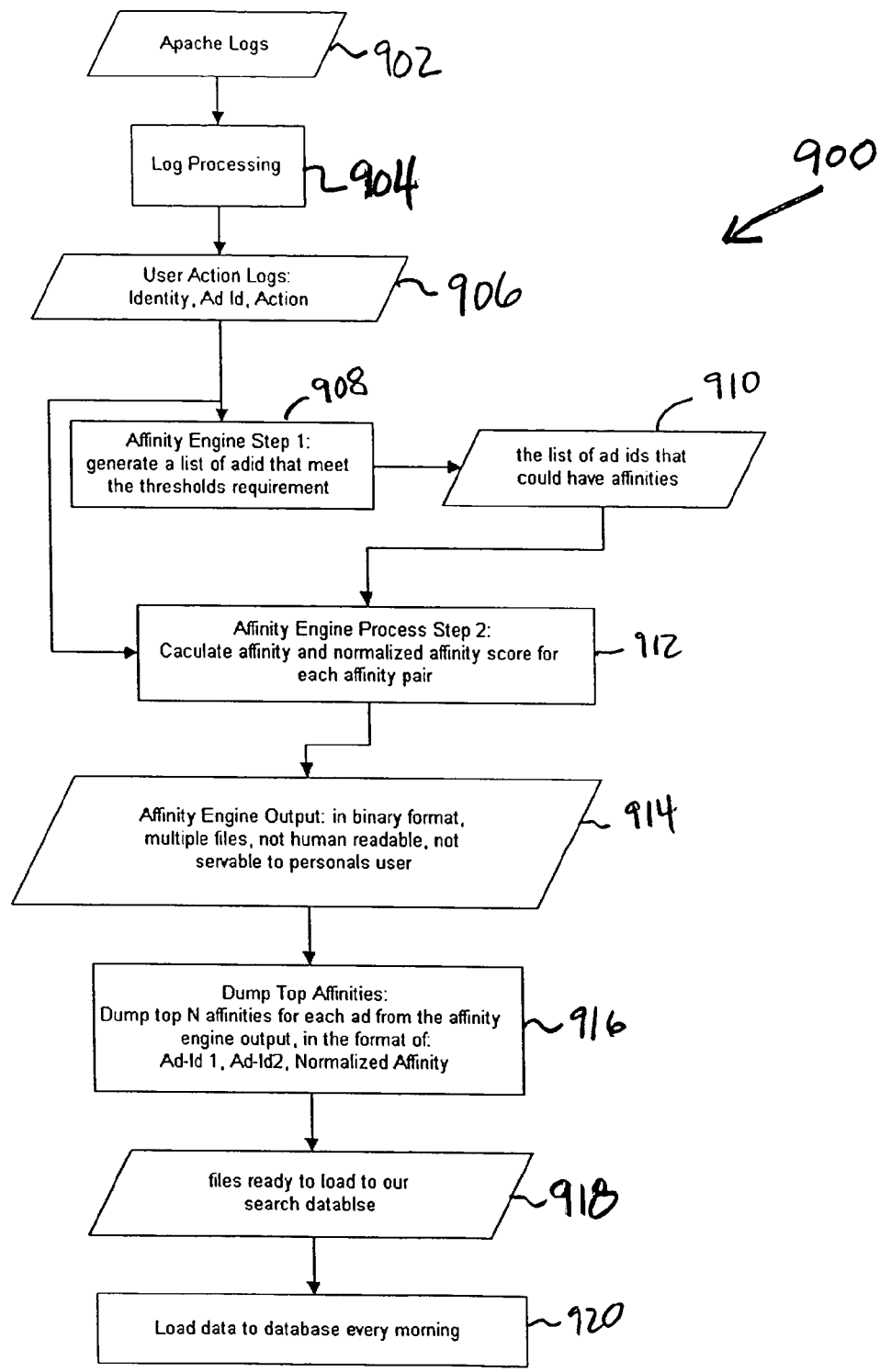
FIG. 9 is an illustrative flow diagram showing a process 900 in accordance with a present embodiment of the invention for determining and prioritizing affinities among personals ad pairs.

FIG. 9 is an illustrative flow diagram showing a process 900 in accordance with a present embodiment of the invention for determining and prioritizing affinities among personals ad pairs. Block 902 represents access logs from page servers, editing servers and mail servers. Block 904 represents processing to extract from the sources 902 information required for affinity analysis. The user action events of interest are: ad detail page-view, reply to an ad, and save an ad. The log processing of block 904 produces the result of this step is the user action logs of block 906.

In a present embodiment, user action logs are in the format of Identity, Ad Id and Action. The identity is a cookie string devised by Yahoo!. It is called b-cookie (browser cookie). It is used to identify a unique user. A user can have multiple Yahoo! Ids, but they will have only one b-cookie in most of cases (in our case, more than 99.5% of time).

An affinity engine in accordance with a present embodiment of the invention basically takes two steps. First, using block 908, for each ad, we collect the number of events by different user for the three type of actions in 30 day worth of user action logs on a sliding window basis. Then based on a set of thresholds, the affinity engine first select a list of ad ids that could have affinity (candidate list, or the one big bucket). The thresholds are:

ad detail page-view event: low: 50 high 150 reply ad: low 5 high 10 save ad: low 5 high 10

The thresholds works in such a way that: an ad is qualified for the big bucket either its number in one category is higher than the high-threshold of that category (for example, an ad has 200 ad detail page views, 2 replies, 2 saves), or all three of its number are in between the thresholds (for example, an ad has 120 ad detail page view, 7 replies, 8 saves). The result is a list of ad ids in block 910.

As the second step, in block 912, for the ads in the "big bucket", the affinity engine looks through the user action logs for ad detail page view events. If it finds that a certain number of people (a.k.a. minimum pair count) looked at ad A also looked at Ad B, then it is convinced that the ad A and ad B is affiliated. The number of minimum pair count is preset to 5 now. For each pair of affiliated ads, the affinity engine will calculate the affinity score (which is a percentage, its value is between 0 and 100) and the normalized affinity score (we also call it lift).

An output of affinity engine is of multiple files in block 914, some in binary format, not servable to our users.

A dumping process represented by block 916 has two functions: for each ad it only dumps the top N affinities according to affinity score; the other function is that since on our web-server we serve the affinity sorting by lift, we don't need affinity score any more, we only need the ad A, ad B, and the lift of A to B. After this process we have the files, represented by block 918, that are loadable to a search databases that is ready to serve the affinity feature to searchers. In block 920, the data files are dumped from process 4 every day.

Affinity scores and a normalized affinity scores are calculated as follows:

Suppose:
X, Y are three different personal Ad
N is the total number of unique user in our user action logs;
X(N) is the number of unique user who looked at ad detail page of ad X;
Y(N) is the number of unique user who looked at ad detail page of ad Y;
N(X,Y) is the number of unique user who looked at both ads;
Off(X,Y) is the affinity score between X and Y $$Aff(X, Y) = \frac{N(X, Y)}{X(N)} \times 100$$

Lift(X,Y) is the normalized affinity score between X and Y $$Lift(X, Y) = \frac{Aff(X, Y)}{\frac{Y(N)}{N}} = \frac{\frac{N(X, Y)}{X(N)} \times 100}{\frac{Y(N)}{N}} = \frac{N(X, Y) \times N \times 100}{X(N) \times Y(N)}$$

Why normalized affinity is important?

Here is an example:
Suppose we have three Ads, X, Y and Z;
N=1000, X(N)=10, Y(N)=100, Z(N)=20, N(X, Y)=5, N(X,Z)=5

So you can see that the affinity scores Aff(X,Y) and Aff(X,Z) are the same: both of them are 5. but given the fact that out of 20 users who viewed Z there are 5 users also viewed ad X (one quarter of the population), and out of the 100 users who viewed Y only 5 users viewed X (5 percents of the population), it is fair to say that X and Z seems to have a stronger affiliation between each other than the affiliation between X and Y. here comes how the normalized affinity score:

$$Lift(X, Y) = \frac{N(X, Y) \times N \times 100}{X(N) \times Y(N)} = 500$$

$$Lift(X, Z) = \frac{N(X, Z) \times N \times 100}{X(N) \times Z(N)} = 2500$$

We can see normalized affinity did suggest stronger affiliation since Lift(X,Z) is 5 times of the value of Lift(X,Y).

D. Affinity Engine Details in a Present Embodiment

The following discussion of affinity engine details discusses affinity engine analyses in terms of text items. However, it will be appreciated that the discussion can refer to indicative searcher actions which can be represented by numbers just as text items can be.

In a present embodiment of the invention, text items are organized for use in affinity analysis. A purpose of an affinity analysis is to determine affinities among text items based upon these groupings. A present embodiment of the invention facilitates affinity analysis by providing a novel organization of pairs of text items in which pairs are identified from groupings of items and in which a novel organization of pairs is developed systematically based upon identities of text items within individual pairs. This novel organization of pairs of text items streamlines subsequent affinity analysis.

Developing a novel organization of pairs of text items in accordance with a present embodiment involves assigning unique integer values to individual items of a multiplicity of item groupings. These unique integer values are called item codes. A multiplicity of pairs of items are identified from the multiplicity of groupings. The pairs of text items are ordered relative to one another based upon their item codes. Specifically, individual pairs of text items are ordered relative to other pairs of text items such that each pair has a unique order position relative to the order positions of other pairs.

A novel pair order information structure provided in a computer readable media can store associations between unique pair order positions and other data such as a count of the number of occurrences of such pair in a given database. Thus, item codes can be used to access the pair order information structure during an affinity analysis. For example, during an affinity analysis, the item codes of the constituent items of a given pair of items can be used determine the unique position of the given pair within the pair order information structure. This unique position information can be used to locate information, such as a count, associated by the pair order information structure with the given pair.

In one embodiment of the invention, individual text items are mapped into item codes and individual item pairs of text items are mapped into unique integer values called pair codes. The mapping of individual pairs into individual pair codes is determined based upon the item codes of the text items in the individual pairs. The order positions of individual pairs depend upon the corresponding individual pair codes which in turn, depend upon item codes of constituent items of the individual pairs. During an affinity analysis, the item codes of the constituent items of a given pair of items can be used determine the unique pair code the given pair. This unique position information can be used to locate information, such as a count, associated by the pair order information structure with the given pair.

D1. Text Items and Groupings

As used herein, a text item may include a set of one or more characters such as letters, numbers, symbols, or combinations thereof, for example. The characters may have meaning as words or phrases, but they are not required to have any particular meaning by themselves. Typically, the text items are organized into a multiplicity of groupings according to some rules, which form no part of the present invention. For example, the text items may be grouped together based upon their being associated with the same IP (internet protocol) address, transaction ID (TID), URL or cookie. For instance, a user might make an internet connection with a particular site and engage in an on-line purchase transaction in which the user purchases a book entitled 'Encyclopedia' and a CD labeled, 'Popular Songs' and tickets to a attend a tour named, 'Luxury Voyage'. A transaction ID for this on-line purchase would be associated with three text items. One would be the text string, 'Encyclopedia'. Another would be the text string, 'Popular Songs'. Yet another would be the text string, 'Luxury Voyage'.

D2. Assignment of Item Codes

The following is an example of an assignment of item codes for items within groupings of items in accordance with an embodiment of the invention. The following illustrative groupings will be used in this example.

G1={x, y, Z}
G2={x, y}
G3={x, Z}

For clarity of explanation, only three groupings are used in this example, although in an actual implementation there may be a multiplicity of groupings, perhaps millions of them. G1, G2 and G3 are group identifiers for three illustrative groups. It will be appreciated that G1, G2 and G3 might be different IP addresses, TIDs, URLs, cookies or some other form of group identifier. Moreover, there might even be a mix of types of groupings such that, G1 identifies an IP address, G2 identifies a TID, and G3 identifies a URL, for example. Item x is text item and a constituent of G1, G2 and G3. Item y is text item and constituent of G1, G2 and G3. Item z is text item and a constituent of only G1.

Integer value item codes are assigned selectively to the text items of G1, G2 and G3. For example, item x may be assigned 1; item y may be assigned 2; and item z may be assigned 3. Integer item code assignments should assigned sequentially. Moreover, an item threshold process may be employed to select items to be assigned of item codes. For instance, an item threshold condition may be imposed that requires that an item be present in at least some prescribed minimum threshold number of groupings in order to qualify for assignment of an item code. Such item threshold process is an optional optimization that seeks to ensure that a item codes are assigned only for items that have a prescribed level of usage throughout the multiplicity of groupings. In this example, if the item threshold is set to be two, then items x and y would receive item codes, but item z would not. If instead the item threshold was set to be three then only item x would receive an item code.

An item code information structure is created that associates text items with unique integer item codes. Assuming that the item threshold is set to one, then a possible item code information structure for the items in this example can be a table as follows.

D3. Item Code Information Structure

| TEXT ITEM | ITEM CODE |
|---|---|
| Item x | 1 |
| Item y | 2 |
| Item z | 3 |

The item code information structure provides a mapping of selected text items to assigned item codes. The above table is just one example of a type of structure that can be used to map items to item codes. The item code information structure may be stored in a computer readable storage medium.

D4. Identifying Item Pairs

The following is an example of identification of item pairs within groupings of items in accordance with an embodiment of the invention. The illustrative groupings shown above will be used in this example. In one embodiment, pairs are identified only for items that passed an item threshold process. If the item threshold was set at one, then the identified pairs would be identified for G1, G2 and G3: (x, y), (x, z), (y, z). If the item threshold was set at two then the identified pair would be (x, y).

In accordance with an embodiment of the invention, item pairs are represented in terms of the item codes of their constituent items. If the item threshold was set at one, and the assigned item codes are x=1, y=2 and z=3, then the item pairs would be represented as (1, 2), (1, 3), (2, 3). If the item threshold was set at two, and the assigned item codes are x=1 and y=2, then the item pair would be represented as (1, 2).

Thus, an item code information structure associates text items with item codes. These item codes are used to represent item pairs. As explained below, the unique item codes of pairs of items are used to order the item pairs such that each pair has a unique order position relative to other pairs. In one embodiment, unique item codes of constituent items of individual pairs are used to compute individual unique pair codes that prescribe the individual unique order positions of the individual pairs.

D5. Ordering Pairs of Text Items

The charts below illustrate examples of ordering of pairs based upon pair codes of constituent text items such that each pair has a unique order position relative to the order positions of other pairs. Each of these charts shows a different possible ordering of item pairs based upon the item codes of constituent items in the pairs. For the sake of brevity and clarity of explanation these examples include only six item pairs each.

These charts illustrate alternative orderings of item pairs. Each chart illustrates a grouping of item pairs based upon one of higher or lower value item codes of the pairs. Specifically, each row of a chart holds a different item code group that is grouped based upon one of the higher or lower value item codes. Each chart further illustrates a prescribed ordering of grouped item pairs. Each chart further illustrates a prescribed ordering of pairs within groups of item pairs.

Referring to Chart 1 for example, the integer values in the left side of the individual chart locations indicate the order position of the item pair in that location. For example, pair (1,2) is in order position "1", and pair (2,4) is in order position "5". The top row has a group of pairs with lower value item code equal to the integer 1. The middle row has a group of pairs with lower value item code equal to the integer 2. The bottom row has a group of pairs with lower value item code equal to the integer 3.

Chart 1 illustrates an ordering of item pairs in which items are grouped based upon lower value item codes. For example, in the item code pair (1,2), 1 is the lower value item code, and 2 is the higher value item code.

Chart 1 illustrates an ordering of groups in which groups with lesser lower value item codes precede groups with higher lower value item codes (reading rows top to bottom). Thus, pairs of the group {(1,2), (1,3), (1,4)} are ordered before (above) pairs of the group {(2,3), (2,4)}. Similarly, pairs of the group {{(2,3), (2,4)} are ordered before (above) the pair of the group {(3,4)}.

Chart 1 illustrates an ordering of pairs within groups in which pairs with lesser higher value item codes precede pairs with greater higher value item codes (reading columns right to left). Thus pairs of group {(1,2), (1,3), (1,4)} are ordered with pair (1,2) first, followed by (1,3) second, followed by (1,4), third.

CHART 1

Lower Value Groups/Lesser Lower Value
First Inter-Group Ordering/Lesser Higher First Intra-Group Ordering

| 1 X | 1 (1, 2) | 2 (1, 3) | 3 (1, 4) |
|---|---|---|---|
| 2 X | X | 4 (2, 3) | 5 (2, 4) |

CHART 1-continued

Lower Value Groups/Lesser Lower Value
First Inter-Group Ordering/Lesser Higher First Intra-Group Ordering

| 3 X | X | X | 6 (3, 4) |
| 4 X | X | X | X |

Chart 2 illustrates an ordering of item pairs in which items are grouped based upon lower value item codes. The groups are ordered such that groups with lesser lower value item codes precede (are above) groups with greater lower value item codes. Pairs within groups are ordered such that pairs with greater higher value item codes precede pairs with lesser higher value item codes. Thus pairs of group {(1,4), (1,3), (1,2)} are ordered with pair (1,4) first, followed by (1,3) second, followed by (1,4), third.

CHART 2

Lower Value Groups/Lesser Lower Value
First Inter-Group Ordering/Greater Higher First Intra-Group Ordering

| 1 X | 1 (1, 4) | 2 (1, 3) | 3 (1, 2) |
| 2 X | X | 4 (2, 4) | 5 (2, 3) |
| 3 X | X | X | 6 (3, 4) |
| 4 X | X | X | X |

Chart 3 illustrates an ordering of item pairs in which items are grouped based upon higher value item codes. The groups are ordered such that groups with greater higher value item codes precede (are above) groups with lesser higher value item codes. Thus, for example, group {(1,4), (2,4), (3,4)} precedes group {(1,3), (2,3)}. Pairs within groups are ordered such that pairs with lesser lower value item codes precede pairs with greater lower value item codes. Thus, for example, pairs of group {(1,4), (2,4), (3,4)} are ordered with pair (1,4) first, followed by (2,4) second, followed by (3,4), third.

CHART 3

Higher Value Groups/Greater Higher Value
First Inter-Group Ordering/Lesser Lower First Intra-Group Ordering

| 1 X | 1 (1, 4) | 2 (2, 4) | 3 (3, 4) |
| 2 X | X | 4 (1, 3) | 5 (2, 3) |
| 3 X | X | X | 6 (1, 2) |
| 4 X | X | X | X |

Chart 4 illustrates an ordering of item pairs in which items are grouped based upon higher value item codes. The groups are ordered such that groups with greater higher value item codes precede (are above) groups with lesser higher value item codes. Thus, for example, group {(3,4), (2,4), (1,4)} precedes group {(2,3), (1,3)}. Pairs within groups are ordered such that pairs with greater lower value item codes precede (reading from left to right) pairs with lesser lower value item codes. Thus, for example, pairs of group {(3,4), (2,4), (1,4)} are ordered with pair (3,4) first, followed by (2,4) second, followed by (1,4), third.

CHART 4

Higher Value Groups/Greater Higher Value
First Inter-Group Ordering/Greater Lower First Intra-Group Ordering

| 1 X | 1 (3, 4) | 2 (2, 4) | 3 (1, 4) |
| 2 X | X | 4 (2, 3) | 5 (1, 3) |

CHART 4-continued

Higher Value Groups/Greater Higher Value
First Inter-Group Ordering/Greater Lower First Intra-Group Ordering

| 3 X | X | X | 6 (1, 2) |
| 4 X | X | X | X |

These charts illustrate just four possible systematic approaches to ordering of item pairs based upon item codes in accordance with the principles of the invention. The assignment of item codes to items permits pairs of items to be represented by the item codes of their constituent items. The above charts illustrate that the pairs of item codes associated with individual items can be employed to deterministically order the pairs such that each pair has a unique order position relative to other pairs. Significantly, each individual pair has a unique order position that is determined based upon a pair of unique item codes assigned to the items that make up the pair.

D6. Computation of Order Position

An order position can be calculated through mathematical computation. The following process includes mathematical computations used to compute the item pair order positions illustrated in Chart 1. Individual order positions of individual pairs are determined based upon item codes assigned to the constituent items of the individual pairs.

The following process can be implemented using computer program code encoded in a computer readable medium. The process computes a unique integer pair code value for given arbitrary item pair (t1,t2) in accordance with an embodiment of the invention. It is assumed that item codes have been assigned for each item of the given item pair. It is further assumed that associations between the items in the pair and item codes assigned to those items have been stored in an item code information structure. It is further assumed that MAX is the greatest item code that has been assigned to any item.

An initial step is to produce an ordered item code pair for the given item pair in which a lower value item code is ordered first, and a higher value item code is ordered second. Thus, for item pair (t1,t2), an item code for t1 and an item code for t2 are retrieved from an item code information structure. It is assumed that for the given item code pair (t1,t2), code1 is the item code that has been assigned to text item t1, and code2 is the item code that has been assigned to text item t2.

In accordance with the pair ordering process,

If (code 2=MAX), then paircode (t1, t2)=code1*MAX−SUM (x) where x=1 to code1,

Else pair (t1, t2)=(code2−code1)+(code1−1)*MAX−SUM (x) where x=1 to code1−1.

For the example set of pair codes of Chart 1, MAX=4.

The following are examples of the computation of unique pair codes and corresponding unique order positions for a representative sampling of the item code pairs of Chart 1.

For the pair of item codes (1,2), code2=2. Therefore, for (1,2), code2#MAX. Thus, paircode (1,2)=(2-1)+(1−1)×4−(0)=1.

For the pair of item codes (2,3), code2=3. Therefore, for (2,3), code2≠MAX. Thus, paircode (2,3)=(3-2)+(2-1)×4−(1)=4.

For the pair of item codes (2,4), code2=4. Therefore, for (2,4), code2=MAX. Thus, paircode (2,4)=(2×4)−(1+2)=5.

This computation process can be employed to build up a database of information concerning item pairs. This same computation process can be used to access that database of information to retrieve stored information concerning the item pairs. During database build up, pair codes computed through the computation process can be used to determine the locations in a storage medium where information associated with individual item pairs is to be stored. Subsequently, assuming that information for individual item pairs in fact has been stored in memory locations determined by their pair codes, the same computation process can be used to compute the pair code for a given item pair in order to locate and retrieve from the storage medium, information related to the item pair. It will be appreciated, of course, that a database of information may be continually built up and revised. Therefore, continued build up and retrieval may occur concurrently.

Furthermore, this computation process can be used create a database of item pair information that can be searched very efficiently. As explained above, unique pair codes may represent unique order positions of item pair related information. Pursuant to one aspect of the invention, pair order position is determined based upon the computation process, and item pair related information is stored in a computer readable medium in order position order. As a result, a linear scan type process can be used more readily to locate stored item pair related information. During information retrieval, locations to be accessed to retrieve item pair related information are computed using the computation process. If item pair information has been stored in unique position order determined by the computation process, then the computation process can be used to compute a linear sequence of locations to be accessed within the storage medium.

For instance, referring to the hypothetical example of Chart 1, the correlation between item codes and pair codes for the top row is as follows.

item code pair (1,2)→pair code=1
   item code pair=(1,3)→pair code=2
   item code pair=(1,4)→pair code=3

A hypothetical example of a correlation between pair code and memory address locations is as follows.

pair code=1→Memory location 1000
   pair code=2→Memory location 1001
   pair code=3→Memory location 1002

Thus, it will be appreciated that all pair related information associated with an item with item code=1 can be accessed through a linear scan search of the storage medium starting with location 1000, followed by 1001 and ending with 1002.

The above example charts each contain only six item code pairs and only six corresponding pair codes. In an actual implementation there may be millions of items and millions of pairs. Since the process for ordering item pairs is scaleable, the same basic pair ordering process can be used to determine item pair order positions and item pair codes for large numbers of pairs. In fact, the benefits of the process in ordering pairs and achieving efficient information storage strategies becomes more evident with increased numbers of items and pairs.

While Charts 1-4 provide examples of four possible orderings of pairs in accordance with the principles of the invention, persons skilled in the art will appreciate that other orderings also may be possible within the scope of the invention. Moreover, while a specific computation process has been described for computing pair codes for the example ordering of Chart 1, it is believed that persons skilled in the art can readily appreciate that similar basic computation principles can be applied to arrive at computation processes for pair orderings of the type shown in example Charts 2-4 as well.

D7. Organizing Affinity Analysis Information

Figure 10:
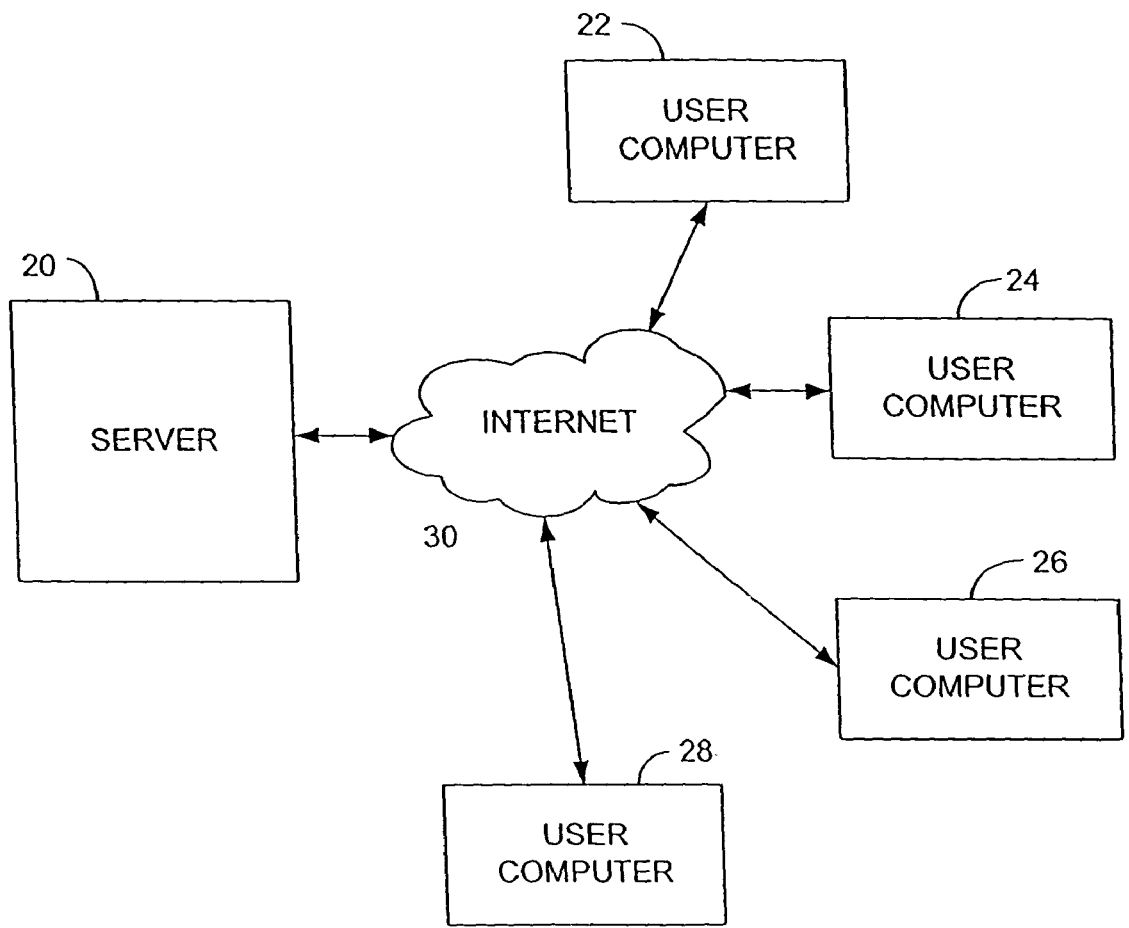
FIG. 10 is an illustrative block diagram showing one internet environment context in which the principles of the invention can be applied.

FIG. 10 is an illustrative block diagram showing one internet computing context in which the principles of the invention can be applied. A server system 20 communicates with a multiplicity of internet-connected computer devices 22, 24, 26 and 28 through the internet 30. The server 20 may be an Internet portal such as the yahoo site: www.yahoo.com and all properties of yahoo, for example. User from computer (22-28) comes to this site to get various information and services e.g. search, mail finance etc. Data collected in this process will be used to do affinity analyses. The computer devices 22-28, for example, may be any user devices used to login to the computer and accessing information over the internet from server 20.

The server 20 gathers groupings of text items through interaction over the internet 30 with computers 22-28. It will be appreciated that the server 20 may communicate with millions of computers every day, although only four representative computers 22-28 are shown in FIG. 10. For example, computers 22-28 may make various requests for information or services. These requests can involve groupings of text items as explained above. The server can process these groupings in order to create a database of information useful for affinity analysis.

The groupings of text items received from user computers 22-28 constitutes input data that is processed to create a database of information useful for affinity analysis. Items in groupings are identified. Item codes are assigned to the items. For example, separate item codes may be assigned to each of the following text items.

Honda
   Honda Motor
   Honda Motor Company

As explained above, a threshold process may be employed to weed out items with de minimus usage for which item codes are not assigned. An item code information structure is created in computer readable medium that stores associations between items and their assigned item codes.

In addition, pairs of items in the groupings in the input data are identified. Pair codes are computed for selected pairs of items for which a corresponding pair of item codes have been assigned. The computation process described above in reference to Chart 1 may be employed to compute pair codes from item codes.

Figure 11:
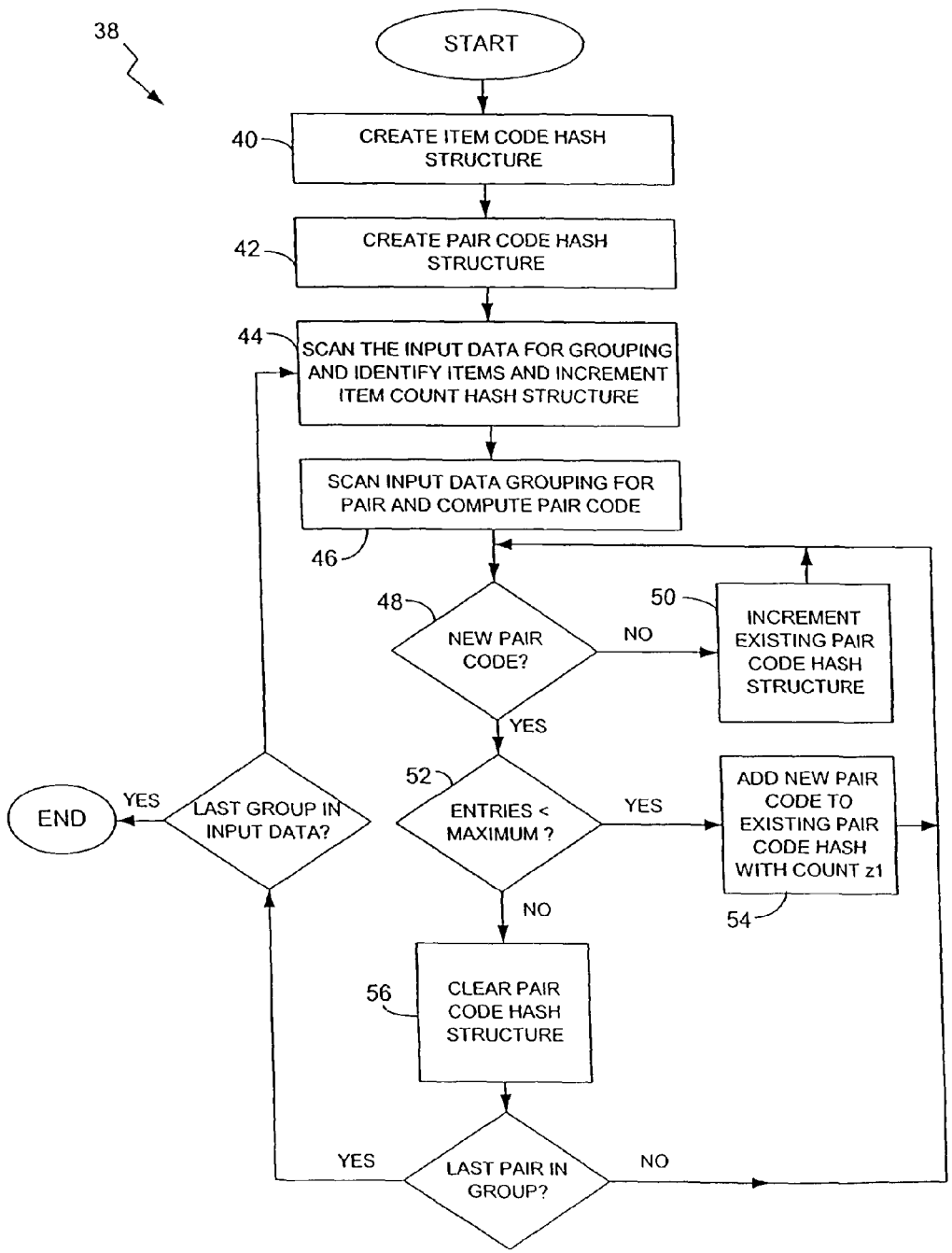
FIG. 11 is an illustrative flow diagram that shows a process for producing information structures in computer readable medium for use in accordance with an embodiment of the invention.

FIG. 11 is an illustrative flow diagram that shows a process 38 using item codes and pair codes to produce information structures in computer readable medium for use in affinity analysis. In step 40, an item count hash structure is provided in which item names are mapped to codes and count. Threshold can be applied in this stage so that only items which are above thresholds are placed in this hash structure. In a present embodiment, the item count hash structure includes a hash table with item codes and item counts. In step 42, a pair count hash structure is provided in which pair codes are mapped to item pair counts. In a present embodiment, the pair count hash structure includes a hash table with pair codes and pair counts.

In step 44, the input data is scanned. For each identified grouping of items, a determination is made as to whether there exist item codes for the items in the group. For items for which item codes already exist, the corresponding item code count in the item code count hash structure is incremented. In a present embodiment, items for which an item code does not yet exist, are ignored as they are below threshold and not significant for analyses.

In step 46, the input data is scanned. For each identified grouping of items, an item code is identified for each item in the grouping, and a pair code is computed for each item pair identified in the grouping. A computation process such as that described above with reference to Chart 1 is used to compute pair codes.

For each such grouping in the input data, the pair count hash structure is updated as follows. In step 48 a determination is made as to whether or not the pair code already is entered in the pair count hash structure. If the pair code for a given item pair already exists in the pair count hash structure, then in step 50, the count corresponding to that pre-existing pair code is incremented by one. If not, then in step 52, a determination is made as to whether the number of entries in the pair count hash structure is less than a MAXIMUM number of allowed entries. If it is less than MAXIMUM, then in step 54, the new pair code is added to the structure with an associated count=1. If the number of entries equals (or exceeds) MAXIMUM, then in step 56, all entries in the pair count hash structure are sorted by pair code to a pair count intermediate information structure. The pair count hash structure is cleared, and the new pair code is added to the newly cleared structure along with an associated count=1 entry.

This above process repeats until all groupings in the input data have been processed. When the scan of the input data has been completed, all item-related information in the item count hash structure is written to an item count information structure. Similarly, when the scan of the input data has been completed, all pair-related information in the pair count hash structure is written to a pair count intermediate information structure. Then all pair count intermediate information structure are merged together and pairs with count above threshold are written to pair count information structure, sorted by pair code.

The following tables are examples of an item code structure, an item count information structure and a pair count information structure that may be produced according to the process of FIG. 11. The information contained in these structures is encoded in a computer readable medium accessed by server 20. It will be appreciated that these structures are just hypothetical examples created for the purpose of explanation. Moreover, for the sake of brevity and clarity of explanation, only a very few items and pairs are listed in these structures. However, persons skilled in the art will appreciate that the same principles apply for large numbers of items and pairs.

| Item Code Structure | |
|---|---|
| TEXT ITEM | ITEM CODE |
| A | 1 |
| B | 2 |
| C | 3 |
| D | 4 |

| Item Count Information Structure | |
|---|---|
| ITEM CODE | ITEM COUNT |
| 1 | 10 |
| 2 | 20 |
| 3 | 15 |
| 4 | 30 |

| Pair Count Information Structure | | |
|---|---|---|
| PAIR CODE | ASSOCIATED ITEM CODES | PAIR CODE COUNT |
| 1 | (1, 2) | 5 |
| 2 | (1, 3) | 6 |
| 3 | (1, 4) | 7 |
| 4 | (2, 3) | 4 |
| 5 | (2, 4) | 5 |
| 6 | (3, 4) | 4 |

D8. Affinity Analysis Example

The information structures in the example above can be used to perform affinity analysis.

For example, using these structures the affinity of text item A for text item B can be determined as follows. For the purpose of this example, the affinity of A to B is defined as count(A,B)/countA.

Retrieve the item codes for text items A and B from the Item Code Information Structure. The item code for A is 1. The item code for B is 2. Use the item codes as indexes into the Item Count Information Structure and retrieve the item count for A. The item count for A is 10. Use a computation process to compute a pair code for the item pair (A,B) using the pair of item codes for A and B, i.e. item code pair (1,2). In this example, the computation process yields pair code 1. Use the computed pair code 1 as an index into the pair count information structure and retrieve the pair count for pair code 1. The retrieved pair count is 5, which means that the pair count of (A,B) is 5. Therefore, the affinity of A for B is $5/10=0.50$.

Conversely, for example, using these structures the affinity of text item B for text item A can be determined using the same procedure. For the purpose of this example, the affinity of A to B is defined as count(A,B)/countB. The example Structures above can be used to ascertain that countB=20, and count(A,B)=5. Therefore the affinity of B for A is, $5/20=0.25$.

Persons skilled in the art will appreciate that affinity information can be analyzed. For example, a comparison of affinities such as A for B and B for A can be to decide what text items are the most meaningful. For example, affinity information can be used to get list of items which have high affinity to the give item, sorted by affinity. For instance, in FIG. 1 in left hand side table there is a list of the car models which have affinity to the primary model. In that example, affinity is computed for all pairs, in which primary model is one of the item. Then these items are sorted by affinity. Using a current implementation of the invention, entire whole analyses can be done in one scan.

It will be understood that the foregoing description and drawings of preferred embodiments in accordance with the present invention are merely illustrative of the principles of the invention. Various modifications can be made by those skilled in the art without departing from the spirit and scope of the invention.

What is claimed is:

1. A computer implemented method of obtaining personal ads, the method comprising:

performing a first search, using at least one computing device, of personal ads to identify a first personals ad;

performing an affinity search, using the at least one computing device, based on the first personals ad identified in the first search to identify one or more second personals ads having an affinity to the first personals ad, wherein the affinity search comprises calculating an affinity score between the first personals ad and each of the second personals ads, wherein the affinity score of each of the second personals ads relates to the number of occurrences of an action taken by a plurality of users with respect to the first personals ad and the respective second personals ad, and wherein the affinity search does not identify personals ads having an affinity score with the first personal ad below a predefined threshold; and prioritizing, using the at least one computing device, the identified second personals ads based upon its respective affinity score with the first personals ad.

2. The method of claim 1, wherein the first personals ad and each of the second personals ads have dissimilar criteria fields relative to each other.

3. The method of 1, wherein the indicated interest in the first personal ad is performed through a website.

4. The method of claim 3, further comprising automatically providing the identified second personals ads to the website.

5. The method of claim 3, further comprising obtaining the first personals ad by performing a criteria field search at the website.

6. The method of 1, wherein performing the first search and the affinity search are in response to input from a first user, and the affinity between the first personals ad and each of the second personals ads is based on input of at least one second user.

7. The method of claim 1, wherein the one or more second personal ads were not identified by the first search.

8. A system for obtaining personals ads, the system comprising at least one computing device that:

performs a first search, using the at least one computing device, of personal ads to identify a first personals ad; and performs an affinity search, using the at least one computing device, based on the first personals ad identified in the first search to identify one or more second personals ads having an affinity to the first personals ad, wherein the affinity search comprises calculating an affinity score between the first personals ad and each of the second personals ads, wherein the affinity score of each of the second personal ads relates to the number of occurrences of an action taken by a plurality of users with respect to the first personals ad and the respective second personals ad, and wherein the affinity search does not identify personals ads having an affinity score with the first personal ad below a predefined threshold; and prioritizes the identified second personals ads based upon its respective affinity score with the first personals.

9. The system of claim 8, wherein the first personals ad and each of the second personals ads have dissimilar criteria fields relative to each other.

10. The system of claim 8, wherein the indicated interest in the first personal ad is performed through a website.

11. The system of claim 10, wherein the at least one computing device further provides the identified second personals ads to the website.

12. The system of claim 10, wherein the at least one computing device further obtains the first personals ad by performing a criteria field search at the website.

13. The system of claim 8, wherein the first search and the affinity search are in response to a input from a first user, and the affinity between the first personals ad and each of the second personals ads is based on input of at least one second user.

14. The system of claim 8, wherein the one or more second personal ads were not identified by the first search.

15. A computer program product comprising program code associated with obtaining personals ads, the computer program product comprising code for a method comprising the steps of:

performing a first search, using at least one computing device, of personal ads to identify a first personals ad;

perform an affinity search, using the at least one computing device, based on the first personals ad identified in the first search to identify one or more second personals ads having an affinity to the first personals ad, wherein the affinity search comprises calculating an affinity score between the first personals ad and each of the second personals ads, wherein the affinity score of each of the second personals ads relates to the number of occurrences of an action taken by a plurality of users with respect to the first personals ad and the respective second personals ad, and wherein the affinity search does not identify personals ads having an affinity score with the first personal ad below a predefined threshold; and prioritizing, using the computing device, the identified second personals ads based upon its respective affinity score with the first personals ad.

16. The computer program product of 15, wherein the first personals ad and each of the second personals ads have dissimilar criteria fields relative to each other.

17. The computer program product of claim 15, wherein the indicated interest in the first personal ad is performed through a website.

18. The computer program product of claim 17, further comprising logic operable to provide the identified second personals ads to the website.

19. The computer program product of claim 17, the step of obtaining the first personals ad by performing a criteria field search at the website.

20. The computer program product of claim 15, wherein the first search and the affinity search are in response to input form a first user, and the affinity between the first personals ad and each of the second personals ads is based on input of at least one second user.

21. The computer program product of claim 15, wherein the one or more second personal ads were not identified by the first search.

* * * * *